(12) United States Patent
Beers et al.

(10) Patent No.: US 10,595,582 B2
(45) Date of Patent: Mar. 24, 2020

(54) LOCKOUT FEATURE FOR A CONTROL DEVICE

(71) Applicant: NIKE, Inc., Beaverton, OR (US)

(72) Inventors: Tiffany A. Beers, Portland, OR (US); Andrew A. Owings, Portland, OR (US)

(73) Assignee: NIKE, Inc., Beaverton, OR (US)

( * ) Notice: Subject to any disclaimer, the term of this patent is extended or adjusted under 35 U.S.C. 154(b) by 0 days.

(21) Appl. No.: 16/000,236

(22) Filed: Jun. 5, 2018

(65) Prior Publication Data

US 2018/0279713 A1     Oct. 4, 2018

Related U.S. Application Data

(62) Division of application No. 14/723,832, filed on May 28, 2015, now Pat. No. 10,010,129.

(51) Int. Cl.
| | | |
|---|---|---|
| *A43B 3/00* | (2006.01) | |
| *A43B 11/00* | (2006.01) | |
| *A43C 11/00* | (2006.01) | |
| *A63B 71/00* | (2006.01) | |
| *A43C 11/16* | (2006.01) | |

(Continued)

(52) U.S. Cl.
CPC ............ *A43B 3/0005* (2013.01); *A41D 1/002* (2013.01); *A43B 11/00* (2013.01); *A43C 11/00* (2013.01); *A43C 11/16* (2013.01); *A43C 11/165* (2013.01); *A63B 71/141* (2013.01); *G05B 15/02* (2013.01); *A41D 19/0024* (2013.01); *A41D 2400/44* (2013.01); *A41F 1/00* (2013.01); *A63B 2071/0081* (2013.01); *A63B 2220/801* (2013.01)

(58) Field of Classification Search
None
See application file for complete search history.

(56) References Cited

U.S. PATENT DOCUMENTS

| | | |
|---|---|---|
| 4,466,204 A | 8/1984 | Wu |
| 4,724,626 A | 2/1988 | Baggio |

(Continued)

FOREIGN PATENT DOCUMENTS

| | | |
|---|---|---|
| CN | 104585975 A | 5/2015 |
| CN | 107847009 A | 3/2018 |

(Continued)

OTHER PUBLICATIONS

"U.S. Appl. No. 14/723,832, Examiner Interview Summary dated Oct. 12, 2017", 3 pgs.

(Continued)

*Primary Examiner* — Damon J Pierce
(74) *Attorney, Agent, or Firm* — Schwegman Lundberg & Woessner, P.A.

(57) ABSTRACT

An article of footwear can include provisions for improving the operation and use of various systems associated with the article. A control device included in the article can be configured to allow manual control of a system by a user. A lockout feature that can disable manual control may be included. During periods of competitive activity, the manual controls may be disabled to allow a user wearing the article to engage in different activities without inadvertent activation of a system. In some cases, the control device and lockout feature can be used in conjunction with a motorized tensioning system.

12 Claims, 10 Drawing Sheets

(51) Int. Cl.
*A41D 1/00* (2018.01)
*G05B 15/02* (2006.01)
*A63B 71/14* (2006.01)
*A41D 19/00* (2006.01)
*A41F 1/00* (2006.01)

(56) References Cited

U.S. PATENT DOCUMENTS

| | | |
|---|---|---|
| 4,848,009 A | 7/1989 | Rodgers |
| 4,862,603 A | 9/1989 | Balbinot |
| 4,891,797 A | 1/1990 | Woodfalks |
| 5,592,759 A | 1/1997 | Cox |
| 5,649,376 A | 7/1997 | Lecates, Jr. |
| 5,661,916 A | 9/1997 | Huang |
| 5,663,614 A | 9/1997 | Weng et al. |
| 5,765,300 A | 6/1998 | Kianka |
| 5,791,068 A | 8/1998 | Bernier et al. |
| 5,812,063 A | 9/1998 | Weng et al. |
| 5,839,210 A | 11/1998 | Bernier et al. |
| 5,936,538 A | 8/1999 | Meschkow et al. |
| 5,954,470 A | 9/1999 | Duell et al. |
| 6,032,387 A | 3/2000 | Johnson |
| 6,087,792 A | 7/2000 | Wang |
| 6,427,361 B1 | 8/2002 | Chou |
| 6,467,194 B1 | 10/2002 | Johnson |
| 6,571,193 B1 | 5/2003 | Unuma et al. |
| 6,575,878 B1 | 6/2003 | Choy |
| 6,691,433 B2 | 2/2004 | Liu |
| 6,788,200 B1 | 9/2004 | Jamel et al. |
| 7,096,559 B2 | 8/2006 | Johnson |
| 7,210,253 B2 | 5/2007 | Yu |
| 7,219,449 B1 | 5/2007 | Hoffberg et al. |
| 7,225,565 B2 | 6/2007 | Dibenedetto et al. |
| 7,254,910 B2 | 8/2007 | Guzman |
| 7,395,614 B1 | 7/2008 | Bailey, Sr. et al. |
| 7,596,891 B2 | 10/2009 | Carnes et al. |
| 7,607,243 B2 | 10/2009 | Berner et al. |
| 7,714,709 B1 | 5/2010 | Daniel |
| 7,714,711 B1 | 5/2010 | Daniel |
| 7,721,468 B1 | 5/2010 | Johnson et al. |
| 7,789,520 B2 | 9/2010 | Konig et al. |
| 7,794,101 B2 | 9/2010 | Galica et al. |
| 8,056,269 B2 | 11/2011 | Beers et al. |
| 8,058,837 B2 | 11/2011 | Beers et al. |
| 8,086,421 B2 | 12/2011 | Case, Jr. et al. |
| 8,234,798 B2 | 8/2012 | Dibenedetto |
| 8,384,551 B2 | 2/2013 | Ross et al. |
| 8,628,453 B2 | 1/2014 | Balakrishnan et al. |
| 8,641,220 B1 | 2/2014 | Lin |
| 8,771,148 B2 | 7/2014 | Balakrishnan et al. |
| 8,879,685 B2 | 11/2014 | Oshio |
| 8,904,673 B2 | 12/2014 | Johnson et al. |
| 8,935,860 B2 | 1/2015 | Torres |
| 8,938,892 B2 | 1/2015 | Case, Jr. |
| 9,204,690 B1 | 12/2015 | Alt et al. |
| 9,392,844 B1 | 7/2016 | Burrell |
| 9,610,185 B2 | 4/2017 | Capra et al. |
| 9,625,485 B2 | 4/2017 | Oleson et al. |
| 9,643,091 B2 | 5/2017 | Vock et al. |
| 9,655,405 B2 | 5/2017 | Hamill |
| 9,693,605 B2 | 7/2017 | Beers |
| 9,733,752 B2 | 8/2017 | Park et al. |
| 9,870,859 B2 | 1/2018 | Weber et al. |
| 10,010,129 B2 | 7/2018 | Beers et al. |
| 2002/0100188 A1 | 8/2002 | Jacques et al. |
| 2002/0120376 A1 | 8/2002 | Miller et al. |
| 2003/0070324 A1 | 4/2003 | Nelson |
| 2003/0150135 A1 | 8/2003 | Liu |
| 2004/0084008 A1 | 5/2004 | Serkh et al. |
| 2004/0107072 A1 | 6/2004 | Dietrich et al. |
| 2004/0110606 A1 | 6/2004 | Wang et al. |
| 2005/0018450 A1 | 1/2005 | Chien |
| 2005/0188566 A1 | 9/2005 | Whittlesey et al. |
| 2006/0002134 A1 | 1/2006 | Capriola |
| 2006/0156588 A1 | 7/2006 | Ferrell |
| 2007/0000154 A1* | 1/2007 | DiBenedetto ........ A43B 1/0036 36/132 |
| 2007/0130804 A1 | 6/2007 | Levy et al. |
| 2007/0209234 A1 | 9/2007 | Chou |
| 2007/0227463 A1 | 10/2007 | Polito |
| 2007/0239328 A1 | 10/2007 | Saposnik |
| 2007/0260421 A1 | 11/2007 | Berner, Jr. et al. |
| 2008/0032870 A1 | 2/2008 | Wu |
| 2008/0161734 A1 | 7/2008 | Blockton |
| 2008/0203144 A1 | 8/2008 | Kim |
| 2008/0301919 A1 | 12/2008 | Ussher |
| 2009/0199435 A1 | 8/2009 | Robinson, Jr. et al. |
| 2009/0223084 A1 | 9/2009 | Kaufman |
| 2009/0267783 A1 | 10/2009 | Vock et al. |
| 2009/0272007 A1 | 11/2009 | Beers et al. |
| 2009/0272013 A1 | 11/2009 | Beers et al. |
| 2009/0288317 A1 | 11/2009 | Forbes |
| 2009/0288318 A1 | 11/2009 | Guzman |
| 2009/0292178 A1 | 11/2009 | Ellis et al. |
| 2010/0131788 A1 | 5/2010 | Lo |
| 2010/0154255 A1 | 6/2010 | Robinson et al. |
| 2010/0192406 A1 | 8/2010 | Au |
| 2010/0223816 A1 | 9/2010 | Barfield |
| 2011/0054359 A1 | 3/2011 | Sazonov et al. |
| 2011/0107771 A1 | 5/2011 | Crist et al. |
| 2011/0153261 A1 | 6/2011 | Jang et al. |
| 2011/0175744 A1 | 7/2011 | Englert et al. |
| 2011/0192058 A1 | 8/2011 | Beers et al. |
| 2011/0192059 A1 | 8/2011 | Spanks et al. |
| 2011/0225697 A1 | 9/2011 | Griffits et al. |
| 2011/0225843 A1 | 9/2011 | Kerns et al. |
| 2011/0260857 A1 | 10/2011 | Hamill |
| 2011/0266384 A1 | 11/2011 | Goodman et al. |
| 2012/0000091 A1 | 1/2012 | Cotterman et al. |
| 2012/0234111 A1 | 9/2012 | Molyneux et al. |
| 2012/0291564 A1 | 11/2012 | Amos et al. |
| 2013/0019694 A1 | 1/2013 | Molyneux et al. |
| 2013/0068570 A1 | 3/2013 | Wedge et al. |
| 2013/0104429 A1 | 5/2013 | Torres |
| 2013/0106603 A1 | 5/2013 | Weast et al. |
| 2013/0130843 A1 | 5/2013 | Burroughs et al. |
| 2013/0201036 A1 | 8/2013 | Stählin et al. |
| 2013/0211290 A1 | 8/2013 | Lee |
| 2013/0213147 A1 | 8/2013 | Rice et al. |
| 2013/0219754 A1 | 8/2013 | Nowak et al. |
| 2013/0312293 A1 | 11/2013 | Gerber |
| 2014/0057233 A1 | 2/2014 | Morag et al. |
| 2014/0066263 A1 | 3/2014 | Huang et al. |
| 2014/0068838 A1 | 3/2014 | Beers et al. |
| 2014/0070042 A1 | 3/2014 | Beers et al. |
| 2014/0082963 A1 | 3/2014 | Beers |
| 2014/0123440 A1 | 5/2014 | Capra et al. |
| 2014/0200834 A1 | 7/2014 | Ross |
| 2014/0228987 A1 | 8/2014 | Case, Jr. et al. |
| 2014/0244009 A1 | 8/2014 | Mestas |
| 2014/0249660 A1 | 9/2014 | Prstojevich |
| 2014/0257156 A1 | 9/2014 | Capra et al. |
| 2014/0277632 A1 | 9/2014 | Walker |
| 2014/0330409 A1 | 11/2014 | Case, Jr. et al. |
| 2014/0336796 A1 | 11/2014 | Agnew |
| 2014/0358472 A1 | 12/2014 | Goel et al. |
| 2014/0360047 A1 | 12/2014 | Beers et al. |
| 2015/0059204 A1 | 3/2015 | Alexander et al. |
| 2015/0096204 A1 | 4/2015 | Case, Jr. |
| 2015/0104772 A1 | 4/2015 | Goel et al. |
| 2015/0157274 A1 | 6/2015 | Ghassemzadeh et al. |
| 2015/0182844 A1 | 7/2015 | Jang |
| 2015/0237962 A1 | 8/2015 | Soderberg et al. |
| 2015/0250268 A1 | 9/2015 | Alt et al. |
| 2015/0289595 A1 | 10/2015 | Rushbrook et al. |
| 2015/0289596 A1 | 10/2015 | Beers et al. |
| 2016/0120733 A1 | 5/2016 | Ishikawa et al. |
| 2016/0256082 A1 | 9/2016 | Ely et al. |
| 2016/0345653 A1 | 12/2016 | Beers et al. |

(56) References Cited

U.S. PATENT DOCUMENTS

2016/0353833 A1 12/2016 Hesterberg et al.
2017/0336026 A1 11/2017 Pizzato et al.

FOREIGN PATENT DOCUMENTS

| DE | 202014003652 U1 | 1/2015 |
|---|---|---|
| EP | 2253238 A1 | 11/2010 |
| JP | 2002119498 A | 4/2002 |
| WO | WO-02054900 A1 | 7/2002 |
| WO | WO-2009071652 A1 | 6/2009 |
| WO | WO-2016191117 A1 | 12/2016 |

OTHER PUBLICATIONS

"U.S. Appl. No. 14/723,832, Non Final Office Action dated Sep. 1, 2017", 14 pgs.
"U.S. Appl. No. 14/723,832, Notice of Allowance dated Mar. 1, 2018", 21 pgs.
"U.S. Appl. No. 14/723,832, Response filed Aug. 8, 2017 to Restriction Requirement dated Jun. 8, 2017", 5 pgs.
"U.S. Appl. No. 14/723,832, Response filed Dec. 29, 2017 to Non Final Office Action dated Sep. 1, 2017", 10 pgs.
"U.S. Appl. No. 14/723,832, Restriction Requirement dated Jun. 8, 2017", 9 pgs.
"International Application Serial No. PCT/US2016/032257, International Preliminary Report on Patentability dated Dec. 7, 2017", 10 pgs.
"International Application Serial No. PCT/US2016/032257, International Search Report dated Oct. 10, 2016", 8 pgs.
"International Application Serial No. PCT/US2016/032257, Written Opinion dated Oct. 10, 2016", 8 pgs.
"Chinese Application Serial No. 201680044191.9 Office Action dated Sep. 12, 2018", w/English Translation, 10 pgs.
"Chinese Application Serial No. 2016800441919, Voluntary Amendment filed Aug. 3, 2018", w/English claims, 13 pgs.
"European Application Serial No. 16728768.9, Response filed Jul. 18, 2018 to Communication Pursuant to Rules 161 and 162 dated Jan. 17, 2018", 27 pgs.
"Chinese Application Serial No. 201680044191.9, Response filed Mar. 25, 2019 to Office Action dated Sep. 12, 2018", w/ English claims, 14 pgs.
"Chinese Application Serial No. 2016800441919, Office Action dated May 17, 2019", W/ English summary, 11 pgs.

* cited by examiner

LOCKOUT FEATURE FOR A CONTROL DEVICE

BACKGROUND

The present embodiments relate generally to articles of footwear and including removable motorized adjustment systems.

Articles of footwear generally include two primary elements: an upper and a sole structure. The upper is often formed from a plurality of material elements (e.g., textiles, polymer sheet layers, foam layers, leather, synthetic leather) that are stitched or adhesively bonded together to form a void on the interior of the footwear for comfortably and securely receiving a foot. More particularly, the upper forms a structure that extends over instep and toe areas of the foot, along medial and lateral sides of the foot, and around a heel area of the foot. The upper may also incorporate a lacing system to adjust the fit of the footwear, as well as permitting entry and removal of the foot from the void within the upper. Likewise, some articles of apparel may include various kinds of closure systems for adjusting the fit of the apparel.

SUMMARY

In one aspect, the present disclosure is directed to an article of footwear, comprising an upper, a sole structure, and a motorized tensioning system, the motorized tensioning system including a control device. The control device includes one or more buttons, the one or more buttons being configured to provide manual control of the motorized tensioning system. In addition, the motorized tensioning system can be operated in a lockout mode in which the manual control of the motorized tensioning system is disabled during periods of competitive activity.

In another aspect, the present disclosure is directed to an article of apparel comprising an electronic system, the electronic system including a control device and the electronic system being operable in a lockout mode during periods of high intensity activity. Furthermore, the control device is configured to provide manual control of the electronic system, where the manual control provided by the control device is disabled when the electronic system is operating in the lockout mode.

In another aspect, the present disclosure is directed to a method of disabling manual controls in a control device associated with an article of footwear, comprising determining if an athlete wearing the article of footwear is engaging in competitive activity, and permitting manual control of the control device if the athlete is determined not to be competing. The method further comprises disabling manual control of the control device if the athlete is determined to be competing.

Other systems, methods, features and advantages of the embodiments will be, or will become, apparent to one of ordinary skill in the art upon examination of the following figures and detailed description. It is intended that all such additional systems, methods, features and advantages be included within this description and this summary, be within the scope of the embodiments, and be protected by the following claims.

BRIEF DESCRIPTION OF THE DRAWINGS

The embodiments can be better understood with reference to the following drawings and description. The components in the figures are not necessarily to scale, emphasis instead being placed upon illustrating the principles of the invention. Moreover, in the figures, like reference numerals designate corresponding parts throughout the different views.

DETAILED DESCRIPTION

Figure 1:
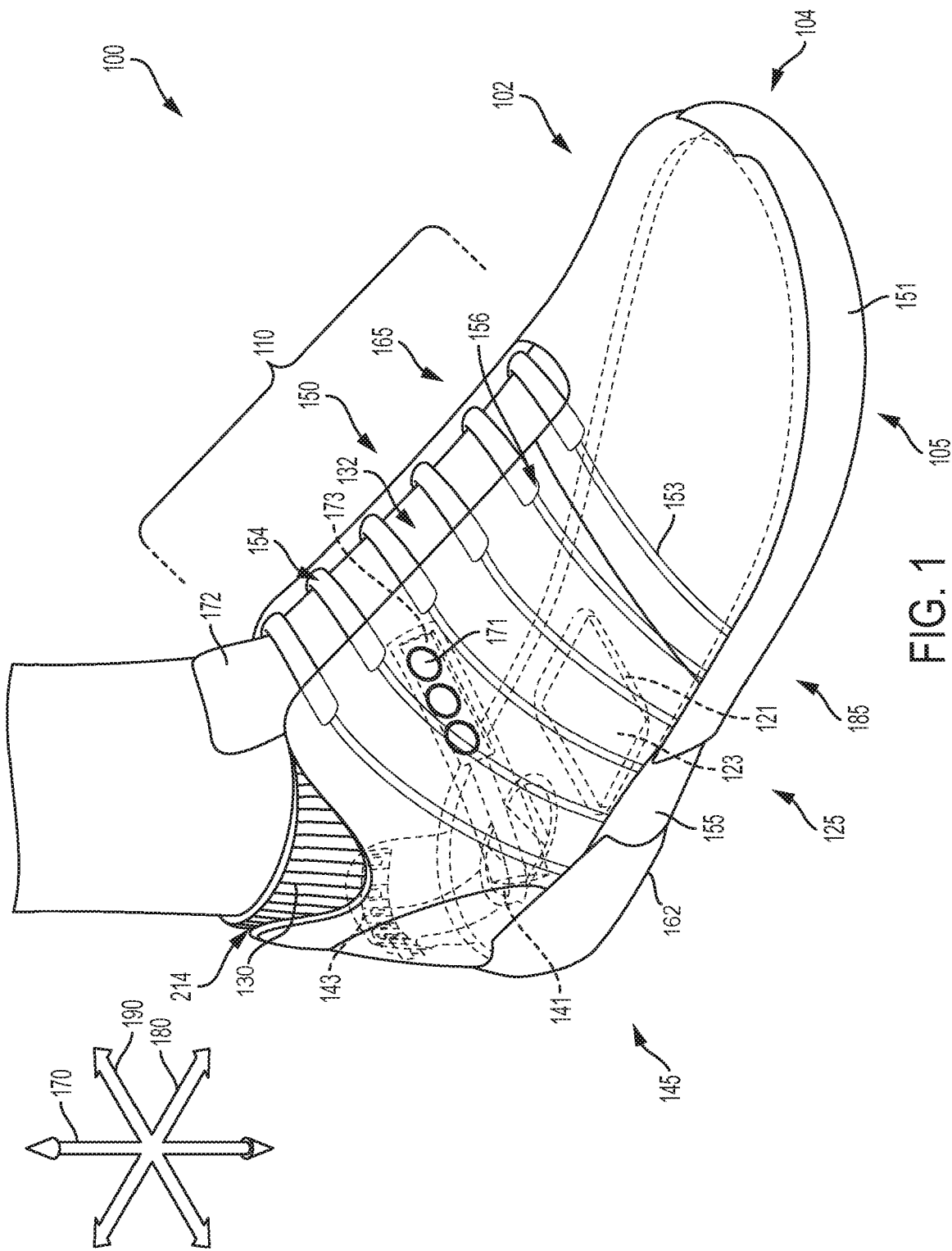
FIG. 1 is a schematic isometric side view of an embodiment of an article of footwear.

The following discussion and accompanying figures disclose articles of footwear and a method of assembly of an article of footwear. Concepts associated with the footwear disclosed herein may be applied to a variety of athletic footwear types, including running shoes, basketball shoes, soccer shoes, baseball shoes, football shoes, and golf shoes, for example. Accordingly, the concepts disclosed herein apply to a wide variety of footwear types.

To assist and clarify the subsequent description of various embodiments, various terms are defined herein. Unless otherwise indicated, the following definitions apply throughout this specification (including the claims). For consistency and convenience, directional adjectives are employed throughout this detailed description corresponding to the illustrated embodiments.

The term "longitudinal," as used throughout this detailed description and in the claims, refers to a direction extending a length of a component. For example, a longitudinal direction of an article of footwear extends between a forefoot region and a heel region of the article of footwear. The term "forward" is used to refer to the general direction in which the toes of a foot point, and the term "rearward" is used to refer to the opposite direction, i.e., the direction in which the heel of the foot is facing.

The term "lateral direction," as used throughout this detailed description and in the claims, refers to a side-to-side direction extending a width of a component. In other words, the lateral direction may extend between a medial side and a lateral side of an article of footwear, with the lateral side of the article of footwear being the surface that faces away from the other foot, and the medial side being the surface that faces toward the other foot.

The term "side," as used in this specification and in the claims, refers to any portion of a component facing generally in a lateral, medial, forward, or rearward direction, as opposed to an upward or downward direction.

The term "vertical," as used throughout this detailed description and in the claims, refers to a direction generally perpendicular to both the lateral and longitudinal directions.

For example, in cases where a sole is planted flat on a ground surface, the vertical direction may extend from the ground surface upward. It will be understood that each of these directional adjectives may be applied to individual components of a sole. The term "upward" refers to the vertical direction heading away from a ground surface, while the term "downward" refers to the vertical direction heading towards the ground surface. Similarly, the terms "top," "upper," and other similar terms refer to the portion of an object substantially furthest from the ground in a vertical direction, and the terms "bottom," "lower," and other similar terms refer to the portion of an object substantially closest to the ground in a vertical direction.

The "interior" of a shoe refers to space that is occupied by a wearer's foot when the shoe is worn. The "inner side" of a panel or other shoe element refers to the face of that panel or element that is (or will be) oriented toward the shoe interior in a completed shoe. The "outer side" or "exterior" of an element refers to the face of that element that is (or will be) oriented away from the shoe interior in the completed shoe. In some cases, the inner side of an element may have other elements between that inner side and the interior in the completed shoe. Similarly, an outer side of an element may have other elements between that outer side and the space external to the completed shoe. Further, the terms "inward" and "inwardly" shall refer to the direction toward the interior of the shoe, and the terms "outward" and "outwardly" shall refer to the direction toward the exterior of the shoe.

For purposes of this disclosure, the foregoing directional terms, when used in reference to an article of footwear, shall refer to the article of footwear when sitting in an upright position, with the sole facing groundward, that is, as it would be positioned when worn by a wearer standing on a substantially level surface.

In addition, for purposes of this disclosure, the term "fixedly attached" shall refer to two components joined in a manner such that the components may not be readily separated (for example, without destroying one or both of the components). Exemplary modalities of fixed attachment may include joining with permanent adhesive, rivets, stitches, nails, staples, welding or other thermal bonding, or other joining techniques. In addition, two components may be "fixedly attached" by virtue of being integrally formed, for example, in a molding process.

For purposes of this disclosure, the term "removably attached" or "removably inserted" shall refer to the joining of two components or a component and an element in a manner such that the two components are secured together, but may be readily detached from one another. Examples of removable attachment mechanisms may include hook and loop fasteners, friction fit connections, interference fit connections, threaded connectors, cam-locking connectors, compression of one material with another, and other such readily detachable connectors.

FIG. 1 illustrates a schematic isometric view of an embodiment of article of footwear 100 that is configured with a tensioning system 150. In the current embodiment, article of footwear 100, also referred to hereafter simply as article 100, is shown in the form of an athletic shoe, such as a running shoe. However, in other embodiments, tensioning system 150 may be used with any other kind of footwear including, but not limited to: hiking boots, soccer shoes, football shoes, sneakers, running shoes, cross-training shoes, rugby shoes, basketball shoes, baseball shoes as well as other kinds of shoes. Moreover, in some embodiments article 100 may be configured for use with various kinds of non-sports related footwear, including, but not limited to: slippers, sandals, high heeled footwear, loafers as well as any other kinds of footwear. As discussed in further detail below, a tensioning system may not be limited to footwear and in other embodiments a tensioning system and/or components associated with a tensioning system could be used with various kinds of apparel, including clothing, sportswear, sporting equipment and other kinds of apparel. In still other embodiments, a tensioning system may be used with braces, such as medical braces.

As noted above, for consistency and convenience, directional adjectives are employed throughout this detailed description. Article 100 may be divided into three general regions along a longitudinal axis 180: a forefoot region 105, a midfoot region 125, and a heel region 145. Forefoot region 105 generally includes portions of article 100 corresponding with the toes and the joints connecting the metatarsals with the phalanges. Midfoot region 125 generally includes portions of article 100 corresponding with an arch area of the foot. Heel region 145 generally corresponds with rear portions of the foot, including the calcaneus bone. Forefoot region 105, midfoot region 125, and heel region 145 are not intended to demarcate precise areas of article 100. Rather, forefoot region 105, midfoot region 125, and heel region 145 are intended to represent general relative areas of article 100 to aid in the following discussion. Since various features of article 100 extend beyond one region of article 100, the terms forefoot region 105, midfoot region 125, and heel region 145 apply not only to article 100, but also to the various features of article 100.

Referring to FIG. 1, for reference purposes, a lateral axis 190 of article 100, and any components related to article 100, may extend between a medial side 165 and a lateral side 185 of the foot. Additionally, in some embodiments, longitudinal axis 180 may extend from forefoot region 105 to a heel region 145. It will be understood that each of these directional adjectives may also be applied to individual components of an article of footwear, such as an upper and/or a sole member. In addition, a vertical axis 170 refers to the axis perpendicular to a horizontal surface defined by longitudinal axis 180 and lateral axis 190.

Article 100 may include upper 102 and sole structure 104. Generally, upper 102 may be any type of upper. In particular, upper 102 may have any design, shape, size and/or color. For example, in embodiments where article 100 is a basketball shoe, upper 102 could be a high top upper that is shaped to provide high support on an ankle. In embodiments where article 100 is a running shoe, upper 102 could be a low top upper.

As shown in FIG. 1, upper 102 may include one or more material elements (for example, meshes, textiles, foam, leather, and synthetic leather), which may be joined to define an interior void configured to receive a foot of a wearer. The material elements may be selected and arranged to impart properties such as light weight, durability, air-permeability, wear-resistance, flexibility, and comfort. Upper 102 may define an opening 130 through which a foot of a wearer may be received into the interior void.

At least a portion of sole structure 104 may be fixedly attached to upper 102 (for example, with adhesive, stitching, welding, or other suitable techniques) and may have a configuration that extends between upper 102 and the ground. Sole structure 104 may include provisions for attenuating ground reaction forces (that is, cushioning and stabilizing the foot during vertical and horizontal loading). In addition, sole structure 104 may be configured to provide traction, impart stability, and control or limit various foot motions, such as pronation, supination, or other motions.

In some embodiments, sole structure 104 may be configured to provide traction for article 100. In addition to providing traction, sole structure 104 may attenuate ground reaction forces when compressed between the foot and the ground during walking, running or other ambulatory activities. The configuration of sole structure 104 may vary significantly in different embodiments to include a variety of conventional or non-conventional structures. In some cases, the configuration of sole structure 104 can be configured according to one or more types of ground surfaces on which sole structure 104 may be used.

For example, the disclosed concepts may be applicable to footwear configured for use on any of a variety of surfaces, including indoor surfaces or outdoor surfaces. The configuration of sole structure 104 may vary based on the properties and conditions of the surfaces on which article 100 is anticipated to be used. For example, sole structure 104 may vary depending on whether the surface is harder or softer. In addition, sole structure 104 may be tailored for use in wet or dry conditions.

In some embodiments, sole structure 104 may be configured for a particularly specialized surface or condition. The proposed footwear upper construction may be applicable to any kind of footwear, such as basketball, soccer, football, and other athletic activities. Accordingly, in some embodiments, sole structure 104 may be configured to provide traction and stability on hard indoor surfaces (such as hardwood), soft, natural turf surfaces, or on hard, artificial turf surfaces. In some embodiments, sole structure 104 may be configured for use on multiple different surfaces.

As will be discussed further below, in different embodiments, sole structure 104 may include different components. For example, sole structure 104 may include an outsole, a midsole, a cushioning layer, and/or an insole. In addition, in some cases, sole structure 104 can include one or more cleat members or traction elements that are configured to increase traction with a ground surface.

In some embodiments, sole structure 104 may include multiple components, which may individually or collectively provide article 100 with a number of attributes, such as support, rigidity, flexibility, stability, cushioning, comfort, reduced weight, or other attributes. In some embodiments, sole structure 104 may include an insole/sockliner, a midsole 151, and a ground-contacting outer sole member ("outsole") 162, which may have an exposed, ground-contacting lower surface. In some cases, however, one or more of these components may be omitted. In one embodiment, sole structure 104 may comprise a sole plate, as will be further discussed below.

Furthermore, in some embodiments, an insole may be disposed in the void defined by upper 102. The insole may extend through each of forefoot region 105, midfoot region 125, and heel region 145, and between lateral side 185 and medial side 165 of article 100. The insole may be formed of a deformable (for example, compressible) material, such as polyurethane foams, or other polymer foam materials. Accordingly, the insole may, by virtue of its compressibility, provide cushioning, and may also conform to the foot in order to provide comfort, support, and stability.

Midsole 151 may be fixedly attached to a lower area of upper 102, for example, through stitching, adhesive bonding, thermal bonding (such as welding), or other techniques, or may be integral with upper 102. Midsole 151 may be formed from any suitable material having the properties described above, according to the activity for which article 100 is intended. In some embodiments, midsole 151 may include a foamed polymer material, such as polyurethane (PU), ethyl vinyl acetate (EVA), or any other suitable material that operates to attenuate ground reaction forces as sole structure 104 contacts the ground during walking, running, or other ambulatory activities.

Midsole 151 may extend through each of forefoot region 105, midfoot region 125, and heel region 145, and between lateral side 185 and medial side 165 of article 100. In some embodiments, portions of midsole 151 may be exposed around the periphery of article 100, as shown in FIG. 1. In other embodiments, midsole 151 may be completely covered by other elements, such as material layers from upper 102. For example, in some embodiments, midsole 151 and/or other portions of upper 102 may be disposed adjacent to a bootie.

Furthermore, as shown in FIG. 1, article 100 may include a tongue 172, which may be provided near or along a throat opening 132. In some embodiments, tongue 172 may be provided in or near an instep region 110 of article 100. However, in other embodiments, tongue 172 may be disposed along other portions of an article of footwear, or an article may not include a tongue.

In addition, as noted above, in different embodiments, article 100 may include a tensioning system 150. Tensioning system 150 may comprise various components and systems for adjusting the size of an opening 130 leading to an interior void (see FIG. 2) and tightening (or loosening) upper 102 around a wearer's foot. Some examples of different tensioning systems that can be used are disclosed in Beers et al., U.S. Patent Publication Number 2014/0070042 published Mar. 13, 2014, (previously U.S. patent application Ser. No. 14/014,555, filed Aug. 30, 2013) and entitled "Motorized Tensioning System with Sensors" and Beers et al., U.S. Pat. No. 8,056,269, issued Nov. 15, 2011 (previously U.S. Patent Publication Number 2009/0272013, published Nov. 5, 2009) and entitled "Article of Footwear with Lighting System" the entire disclosures of which are incorporated herein by reference.

In some embodiments, tensioning system 150 may comprise one or more laces, as well as a motorized tensioning device. A lace may be configured to pass through various lacing guides 154, which may be further associated with the edges of a throat opening 132. In some cases, lacing guides 154 may provide a similar function to traditional eyelets on uppers. In particular, as a lace is pulled or tensioned, throat opening 132 may generally constrict so that upper 102 is tightened around a foot.

The arrangement of lacing guides 154 in FIG. 1 is only intended to be exemplary and it will be understood that other embodiments are not limited to a particular configuration for lacing guides 154. Furthermore, the particular types of lacing guides 154 illustrated in the embodiments are also exemplary and other embodiments may incorporate any other kinds of lacing guides or similar lacing provisions. In some other embodiments, for example, laces could be inserted through traditional eyelets. Some examples of lace guiding provisions that may be incorporated into the embodiments are disclosed in Cotterman et al., U.S. Patent Application Publication Number 2012/0000091, published Jan. 5, 2012 and entitled "Lace Guide," the disclosure of which is incorporated herein by reference in its entirety. Additional examples are disclosed in Goodman et al., U.S. Patent Application Publication Number 2011/0266384, published Nov. 3, 2011 and entitled "Reel Based Lacing System", the disclosure of which is incorporated herein by reference in its entirety. Still additional examples of lace guides are disclosed in Kerns et al., U.S. Patent Application Publication Number 2011/0225843, published Sep. 22, 2011 and entitled "Guides For Lacing Systems," the disclosure of which is incorporated herein by reference in its entirety.

A lace as used with article 100 may comprise any type of type of lacing material known in the art. Examples of laces that may be used include cables or fibers having a low modulus of elasticity as well as a high tensile strength. A lace may comprise a single strand of material, or can comprise multiple strands of material. An exemplary material for the lace is SPECTRA™, manufactured by Honeywell of Morris Township N.J., although other kinds of extended chain, high modulus polyethylene fiber materials can also be used as a lace. Still further exemplary properties of a lace can be found in the Reel Based Lacing Application mentioned above.

Thus, in some embodiments, a lace may be passed through lacing guides 154. In other embodiments, a lace may pass through internal channels 153 within upper 102 after entering channel openings 156 that are near lacing guides 154. In some embodiments, internal channels 153 extend around the sides of upper 102 and guide the lace towards a motorized tensioning device disposed in sole structure 104. In some cases, the motorized tensioning device may include provisions for receiving portions of a lace. In some cases, end portions of the lace can exit internal channels 153 of upper 102 and can pass through apertures in a housing unit that contains a motorized tensioning device.

In some embodiments, a motorized tensioning device may generally be configured to automatically apply tension to a lace for purposes of tightening and loosening upper 102. A motorized tensioning device may thus include provisions for winding a lace onto, and unwinding a lace from, a spool internal to the motorized tensioning device. Moreover, the provisions may include an electric motor that automatically winds and unwinds the spool in response to various inputs or controls.

Furthermore, in some embodiments, article 100 may utilize various kinds of devices for sending commands to a motorized tensioning device or other mechanisms that can be associated with the motorized tensioning device, such as a control device. In some embodiments, buttons for tightening, loosening and/or performing other functions can be located directly on or in an article on a control device. For purposes of this disclosure, buttons refer to a material or element that can be pressed or otherwise handled, such as a button, switch, knob, control, lever, handle, or other such control means. In some embodiments, the control device may include various buttons, switches, mechanisms or components that can be used to operate a mechanism. In some embodiments, buttons can be utilized to measure current, pressure, or other properties in article 100. In different embodiments, the control device may include components or elements that can detect and measure a relative change in a force or applied load, detect and measure the rate of change in force, identify force thresholds and/or detect contact and/or touch.

Thus, in different embodiments, an article may include provisions for actuating, managing, commanding, directing, activating, or otherwise regulating the functions of other devices or systems. In FIG. 1, while upper 102 and sole structure 104 are depicted in solid line, portions within article 100 are depicted in dotted line to provide a view of various components. For example, as noted above, in one embodiment, article 100 may include a control device 173. Referring to FIG. 1, in some cases, control device 173 may include one or more buttons 171 disposed along a button board or panel. In one specific embodiment, buttons 171 could be used for initiating incremental tightening and incremental loosening commands, for example.

Thus, in different embodiments, when a user engages with control device 173, a variety of different operations may be activated or discontinued. For purposes of reference, throughout the detailed description and in the claims, various operating modes or configurations, of a tensioning system are described. These operating modes may refer to states of the tensioning system itself, as well as to the operating modes of individual subsystems and/or components of the tensioning system. Exemplary modes include an "incremental tighten mode", an "incremental loosen mode" and a "fully loosen" mode. The latter two modes may also be referred to as an "incremental release mode" and a "full release mode". In the incremental tighten mode, tensioning system 150 may operate in a manner that incrementally (or gradually) tightens, or increases the tension of a lace or other tensile element. In the incremental loosen mode, a motorized tightening device may operate in a manner that incrementally (or gradually) loosens, or releases tension in the tensile element(s). In the full release mode, tensioning system 150 may operate in a manner so that tension applied to the lace by the system is substantially reduced to a level where the user can easily remove his or her foot from the article. This is in contrast to the incremental release mode, where the system operates to achieve a lower tension for the tensile element relative to the current tension, but not necessarily to completely remove tension from the tensile elements. Moreover, while the full release mode may be utilized to quickly release lace or tensile element tension so the user can remove the article, the incremental release mode may be utilized to make minor adjustments to the lace tension as a user searches for the desired amount of tension. Other operating modes may also be possible.

In other embodiments, additional buttons can be included for initiating any other commands including an open command (or fully loosen command), a store tension command, or a return to stored tension command. Still other embodiments could incorporate any other buttons for issuing any other kinds of commands. In one embodiment, in order to interact with the control device and the features of tensioning system 150, a user may contact and/or exert a force against a portion of control device 173, such as buttons 171, as will be described further below with respect to FIGS. 8-11.

In some situations, during use of article 100, a wearer of article 100 may be involved in activities where interaction with control device 173 is unnecessary, or may be undesirable. For example, in some situations, a user may find buttons 171 may be prone to inadvertent actuation, such as when a user brushes up against a button while interacting with another person or object. Thus, in different embodiments, it may be beneficial to a user to provide article 100 and/or any system associated with article 100 with a lockout mode or feature. For purposes of this disclosure, a lockout mode or a lockout feature provides the ability to lock out or disable the operation of the control device or any other manual controls associated with tensioning system 150. In some cases, the lockout feature may be linked to or include a provision that allows tensioning system 150 the ability to subsequently enable and/or re-enable the operation of the control device as well. In one embodiment, when a lockout feature is activated, manual controls may be disabled for some duration of time. It should be understood that throughout the specification and in the claims, the term lockout mode may be generally interchangeable with the term lockout feature. Furthermore it should be understood that while a lockout mode provides tensioning system 150 the capacity to disable manual controls, it further includes provisions for enabling manual controls (i.e., returning manual controls to a functional state).

In some embodiments, the lockout feature can selectively enable or disable predefined functions of a user interface to prevent persons without knowledge of or authorized access to the control device (such as individuals other than the wearer of the article) from altering the state of a system associated with an article. Furthermore, in one embodiment, the lockout feature can disable the controls such that inadvertent contact with buttons by the wearer is substantially prevented. This can preclude the activation of various functions associated with the article, such as loosening and tightening functions in a tensioning system. In this way, chance, arbitrary, casual, unintentional or other unplanned contact with the control device while the user is engaged in athletic or competitive activity, for example, may have little effect on the functioning of the system associated with the article.

For purposes of this disclosure, "athletic activity" or "competitive activity" refers to physical activity by an individual that includes either high intensity motion and/or continuously repetitive intermediate intensity motions, such as running, throwing, batting, kicking, walking, and bicycling, or other activities. Furthermore, competitive activity can encompass any of motions, gestures, movements, and/or actions related to any sport, including basketball, baseball, soccer, track and field, cricket, softball, lacrosse, equine sports, football, hockey, rugby, field hockey, volleyball, badminton, and other sports. Thus, athletic or competitive activities can occur during a game, a practice session, a workout, etc., and include team oriented athletic activities or individual-based activity. In other words, competitive activity need not involve competition with another individual. Furthermore, competitive activity need not refer to a highly active state, as an individual may be competing while walking or during other gradual or gentle physical movements.

For purposes of this specification, the term athletic activity may be used interchangeably with the term competitive activity. In addition, "non-competitive activity" refers to physical activity by an individual that includes motion that falls under intermediate intensity activity and/or stationary or 'at rest' states. For example, an individual seated on a bench or a court is engaged in non-competitive activity. The various thresholds referred to herein (i.e., high intensity and intermediate intensity) will be discussed in further detail below.

In order to measure and assess whether an individual is engaged in competitive activity (versus non-competitive activity), there may be a variety of sensors and other signal inputs to the system that provide information regarding the individual's level of motion. For example, in one embodiment, an accelerometer may be used to determine whether the user is engaged in motion that can be categorized as competitive activity or non-competitive activity. In different embodiments, a variety of sensor mechanisms may be incorporated or used with an article to measure and/or collect data regarding a user's activity. In some cases, sensors can determine one or more of the type or intensity or a user's movements, a user's speed or direction, distance traveled, muscle tension, weight or force distributions that are associated with a user, and other performance metrics. Some embodiments of articles and systems disclosed herein may refer to features described in Balakrishnan et al., U.S. Pat. No. 8,771,148, issued Jul. 8, 2014, titled "Athletic performance monitoring systems and methods in a team sports environment," (previously U.S. patent application Ser. No. 13/660,743, filed Oct. 25, 2012), Case, Jr., U.S. Patent Publication Number 2015/0096204, published Apr. 9, 2015, titled "Systems for Activating and/or Authenticating Electronic Devices for Operation With Footwear and Other Uses," (previously U.S. patent application Ser. No. 14/572,322, filed Dec. 16, 2014), Case, Jr. et al., U.S. Pat. No. 8,086,421, issued Dec. 27, 2011, titled "Multi-Sensor Monitoring of Athletic Performance." (previously U.S. patent application Ser. No. 12/770,355) filed Apr. 29, 2010, Case, Jr. et al., U.S. Patent Publication Number 2014/0330409, published Nov. 6, 2014, titled "Multi-Sensor Monitoring of Athletic Performance," (previously U.S. patent application Ser. No. 14/301,047, filed Jun. 10, 2014), Goel et al., U.S. Patent Publication Number 2014/0358472, published Dec. 4, 2014, titled "Dynamic Sampling," (previously U.S. patent application Ser. No. 14/291,992, filed May 30, 2014), Case, Jr. et al., U.S. Patent Publication Number 2014/0228987, published Aug. 14, 2014, titled "Multi-Sensor Monitoring of Athletic Performance," (previously U.S. patent application Ser. No. 14/253,507, filed Apr. 15, 2014), Prstojevich, U.S. Patent Publication Number 2014/0249660, published Sep. 4, 2014, titled "Multi-Mode Acceleration-Based Athleticism Measurement System," (previously U.S. patent application Ser. No. 14/273,585, filed May 9, 2014), Mestas, U.S. Patent Publication Number 2014/0244009, published Aug. 28, 2014, titled "Activity Monitoring, Tracking and Synchronization," (previously U.S. patent application Ser. No. 14/186,425, filed Feb. 21, 2014), and Goel et al., U.S. Patent Publication Number 2015/0104772, published Apr. 16, 2015, titled "Fitness device configured to provide goal motivation," (previously U.S. patent application Ser. No. 14/513,398, filed Oct. 24, 2014), the disclosures of each application being herein incorporated by reference in their entirety.

In some embodiments, an article may include at least one sensor. For example, referring again to FIG. 1, article 100 includes a first sensor 141 disposed along heel region 145 of sole structure 104 and a second sensor 143 disposed along heel region 145 of upper 102. In different embodiments, the sensors or sensor system associated with an may comprise a RADAR-based sensor system, a radio or radio frequency based sensor system, a global positioning satellite based sensor system, a magnet based sensor system, a magnetic coil based sensor system, a pressure sensor system, an accelerometer sensor system, a gyroscope based sensor system, a time sensor or clock, and a compass, where the at least one sensor system is provided in or on an article of apparel or an article of footwear. Some embodiments of the articles described herein can include features described in Balakrishnan et al., U.S. Pat. No. 8,628,453, issued on Jan. 14, 2014, titled "Athletic Performance Monitoring Systems and Methods in a Team Sports Environment," (previously U.S. Patent Publication Number 2013/0130843, published May 23, 2013), and Morag et al., U.S. Patent Publication Number 2014/0057233, published Feb. 27, 2014, titled "Integrated Training System for Articles of Footwear," (previously U.S. application Ser. No. 13/972,510) the contents of each of which are hereby incorporated by reference in their entirety.

In different embodiments, tensioning system 150 (or any other system configured for use with article 100) may include an operating system that controls and monitors the functions of tensioning system 150. In some cases, the operating system can represent the main functional center of tensioning system 150. In some embodiments, the operating system can include a lockout mode which disables manual controls, as noted above. Thus, in one embodiment, an electronic system such as tensioning system 150 that is associated with an article of footwear can include a lockout mode. In some embodiments, an operating system may be incorporated or associated with a control unit. In one embodiment, the control unit can be an electronic control unit or a digital circuit. In other embodiments, the control unit can comprise any processor or component that directs the operation of a processor or system.

Thus, in some embodiments, article 100 may include provisions for enabling or disabling various functions of tensioning system 150 through the operation of a control unit. In some embodiments, referring to FIG. 1, a control unit 123 may be disposed in sole structure 104 of article 100. For example, in one embodiment, control unit 123 may be disposed in a cavity 121 formed in a sole plate 155, where sole plate 155 comprises a layer of sole structure 104.

In different embodiments, control unit 123 may function to control the inputs and outputs of various data (for example, data received through first sensor 141 and/or second sensor 143), and route the signals associated with the data to the correct subsystems. Furthermore, control unit 123 may integrate or utilize the information or signals it receives to make various determinations that guide the functions and operations of tensioning system 150. For example, control unit 123 can send and receive control signals from control device 173. In one embodiment, control unit 123 may receive certain signals from first sensor 141 and/or second sensor 143 and make a determination that the manual controls associated with control device 173 are to be disabled. As will be discussed further below, in some embodiments, control unit 123 may initiate a lockout mode. In some cases, control unit 123 can send a signal to control device 173 to ignore or block the receipt of signals being emitted as a result of any interaction with buttons 171 of control device 173 during the lockout mode.

Thus, in different embodiments, a user may be able to utilize control device 173 to interact, engage, operate, and/or activate various functions of the article, and also be precluded from operation of the same. In some embodiments, these functions can include aspects that are associated with tensioning system 150 (or other electrical or mechanical systems disposed in article 100), as described with respect to FIG. 1.

Figure 2:
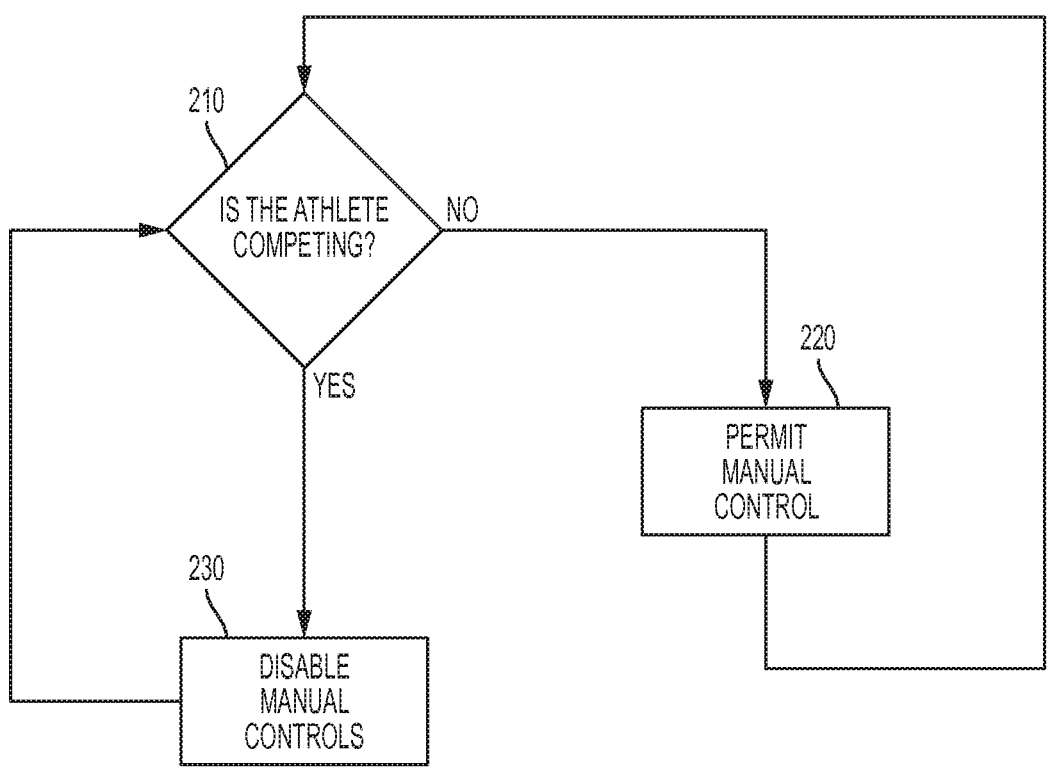
FIG. 2 is a flow chart representing an embodiment of a method of disabling manual control.

Referring now to FIG. 2, a flow chart representing an embodiment of the operation of a lockout mode is depicted. FIG. 2 illustrates a first step 210, where a determination is made as to whether the user (here, the athlete) is engaging in competitive activity. If it is determined that the user is not engaging in competitive activity, manual control of the article's control device is permitted, as shown in a second step 220. If it is determined that the user is engaging in competitive activity, manual control of the article's control device is disabled, as shown in a third step 230.

Figure 3:
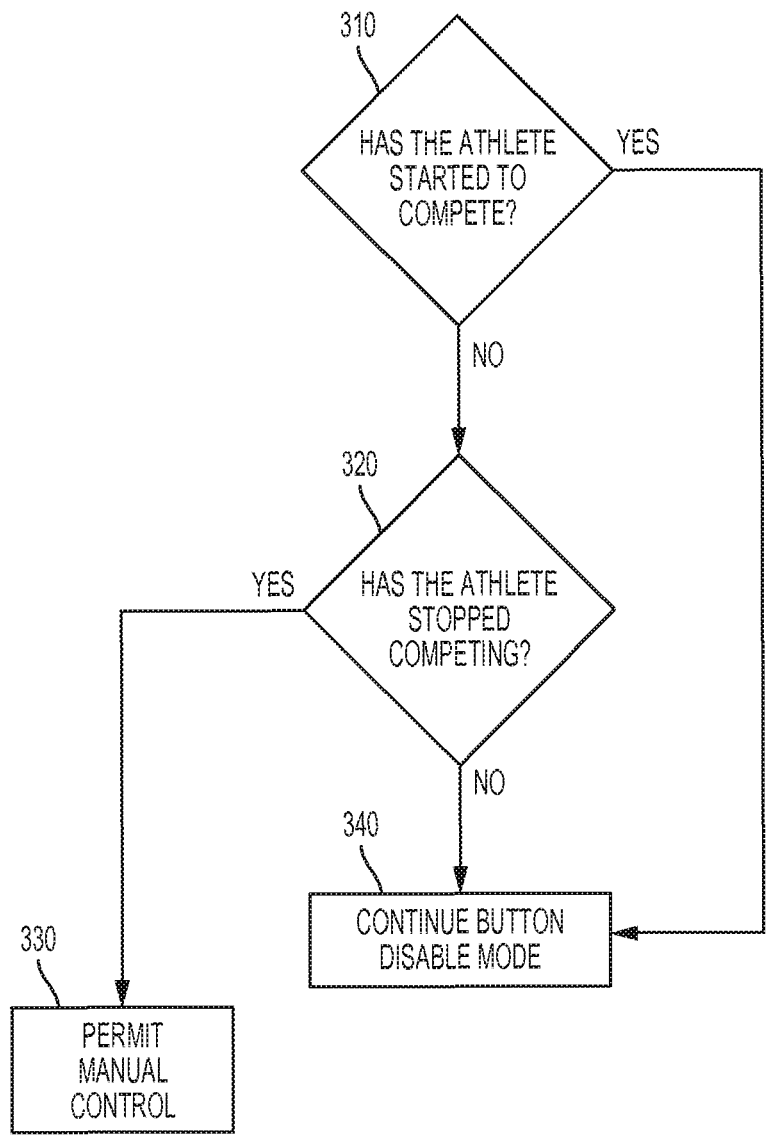
FIG. 3 is a flow chart representing an embodiment of a method of disabling manual control.

Referring to FIG. 3, a flow chart representing another embodiment of the operation of a lockout mode is depicted. FIG. 3 illustrates a first step 310, where a determination is made as to whether the user (here, the athlete) has begun to compete or engage in athletic activity. If it is determined that the user is not beginning to compete, a determination is made as whether the user has discontinued any competitive activity in a second step 320. Thus, if it is determined that the user has ceased engaging in (or not initiated any) competitive activity, manual control of the article's control device is permitted or re-enabled, as shown in a third step 330. Furthermore, returning to first step 310, if the user has begun to compete as determined by the system, the manual controls (button functioning) are disabled in a fourth step 340. Similarly, if the user has been engaging in competitive activity and is continuing to do so (as shown in second step 320), manual controls (button functioning) are disabled in fourth step 340.

It should be understood that, in some embodiments, the lockout feature can be deactivated or terminated upon a specific user interaction. For example, a particular user input to the system, such as a coordinated pattern of user inputs on the control device, may be configured to reestablish manual control. In one embodiment, the lockout feature may also be configured to re-enable one or more of the manual control buttons after a programmed duration of time, rather than any additional user interaction with the control device. It should also be understood that the embodiments described herein with respect to the disablement of a control device may be applicable to articles that do not include a tensioning system. In other words, the control device and the lockout mode may be utilized in any type or configuration of footwear or article of apparel that includes a system with a control device.

In different embodiments, the disabling of the manual controls as described with respect to the lockout feature herein can be optimized for various types of activities. For example, in one embodiment, the article can collect data and classify the activity of a user as either intermediate intensity performance (i.e., where the activity falls below a particular threshold) or high intensity performance (i.e., where the activity lies above a particular threshold).

Depending on the basis or factors measured during the use of the article, the measured activity can denote the level of intensity with which the physical activity (if any) is being performed. In some embodiments, this intensity level can either be an exact value or an approximate grading level on a predefined analysis scale. For example, activity may be classified into categories such as "no activity—0", "minimal intensity—1", "low intensity—2", "intermediate intensity—3", and "high intensity—4". In other embodiments, a fewer or greater number of levels discriminating between varying types of activities may be defined.

In different embodiments, one or more kinds of signals or inputs can be integrated to determine the level of intensity of the physical activity of the user. In some embodiments, a scale characterizing physical activity may be used that defines the intensity as a function of the various data collected during use of the article and its sensors, as described above. The term intensity in the context of the present disclosure should be understood to describe a value corresponding to the level of physical activity that is derived from a measured signal from the one or more sensors. Thus, in some embodiments, an article may include a classification system or process, with which the various input signals are evaluated, and based on the inputs, a determination made as to the level of activity intensity of the wearer. Furthermore, in other embodiments, depending on the intensity classification calculated by the system, additional input may be considered. For example, in cases where it is determined that the wearer is engaged in intermediate intensity activity, the duration of time or the frequency of the activity may be taken into account.

Figure 4:
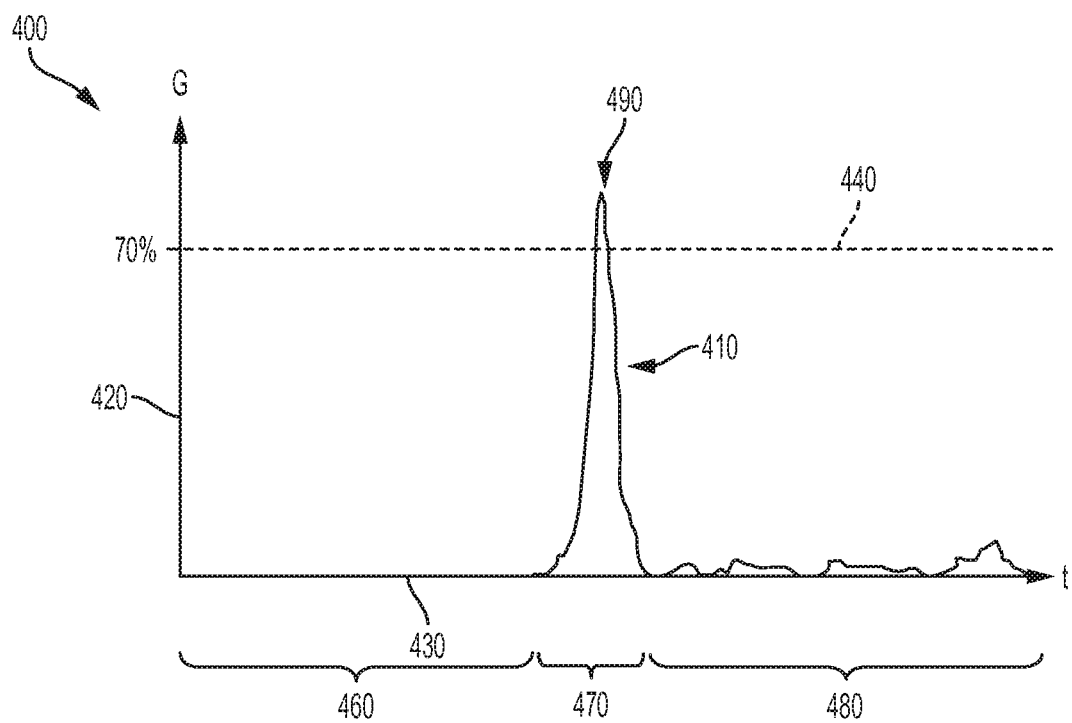
FIG. 4 is an embodiment of a representation of a high intensity activity event.
Figure 5:
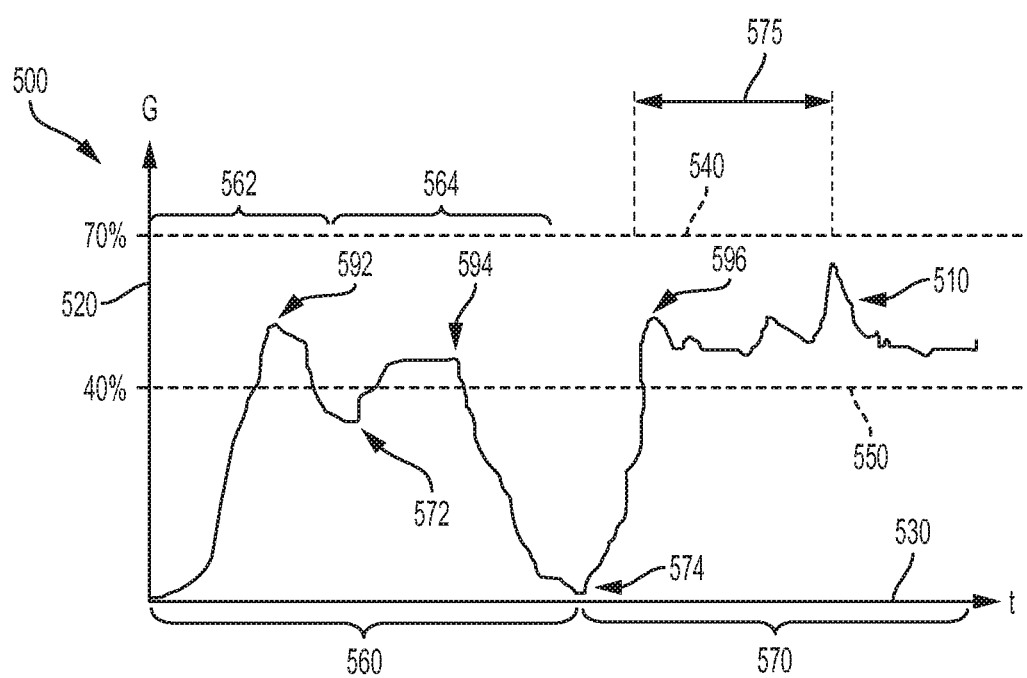
FIG. 5 is an embodiment of a representation of intermediate intensity activity.

Referring to FIGS. 4 and 5, two examples of an assessment process are depicted. In FIG. 4, an example of input 410 (illustrated by an irregularly shaped line) is represented generally in a first graph 400, where input 410 can be received by the various sensors for an individual wearing an article as described herein. First graph 400 includes an activity axis 420 (labeled as "G") and a time axis 430

(labeled as "t"). Along activity axis 420, a dotted line represents a threshold above which the activity is deemed "high intensity" (herein referred to as a high intensity threshold 440). In this case, the threshold is associated with a 70% marker of signal activity. However, in other embodiments, a high intensity threshold can be set to any other threshold, such that the threshold is greater than 70% or less than 70%. In some embodiments, a high intensity threshold can be between 50% and 80%. In other embodiments, a high intensity threshold can be set above 75%.

During a first interval 460, based on the sensor information being received, the individual wearing the article is determined to be generally stationary. However, as depicted in a second interval 470, the activity sharply increases, and a peak 490 rises above high intensity threshold 440. In some embodiments, the registration of an activity that rises above high intensity threshold 440 can provide a trigger to the system. In one embodiment, the trigger may indicate that the individual has initiated competitive activity. As noted above, in some embodiments, the lockout feature can be activated in response to the high intensity event associated with peak 490. In some embodiments, the electronic system associated with the article may thus be operable in a lockout mode during periods of high intensity activity.

In some embodiments, the lockout feature may be activated for a specified duration before the system reevaluates the activity level of the user. Thus, while the high intensity event associated with peak 490 occurs for a relatively brief period before input 410 drops below high intensity threshold 440 again, the lockout feature can remain activated for a longer time in different embodiments. In some embodiments, the lockout feature may have a preset minimum activation period, during which manual controls remain disabled once the lockout feature is triggered, regardless of the activity level of the user following the trigger. Thus, in some embodiments, the evaluation of activity may not affect the application or termination of the lockout feature. In other words, during a third interval 480, the lockout feature may continue to disable the manual controls of the article.

However, in other embodiments, the lockout feature may respond continuously to real-time events, such that the lockout feature is activated only when motion above the high intensity threshold is detected, and deactivated substantially soon after the activity drops below the high intensity threshold. In this case, while the lockout feature may be activated as soon as activity rises above high intensity threshold 440, it may also be deactivated as soon as activity drops below high intensity threshold 440 in third interval 480.

In other embodiments, instead of only waiting a determined period of time, as described above, the reevaluation of whether competitive activity has ceased may be triggered by sensor information. In one example, sensor-based triggering may replace the waiting period, with sensor information causing reevaluation of activity level to occur. In another example, a waiting period may occur as indicated above, but with sensor information possibly causing the waiting period to be terminated early, triggering a reevaluation of activity level.

Sensors providing the types of information discussed here to a control device might include, but are not limited to, pressure sensors in shoe insoles to detect standing and/or rate of motion, bend indicators, strain gauges, gyroscopes, and accelerometers. For example, pressure sensors could be used to measure contact pressures of the upper of an article of footwear against the foot of a wearer and automatically adjust the duration of time between the reevaluation of activity levels (for example, if it is determined the user has transitioned from standing to sitting). In some embodiments, a control device may be configured to store sensor information obtained over a period of time to help identify triggering events.

Some embodiments may be configured to operate in two or more different states. For example, some embodiments could operate in a "normal state" and a "game state" (or similarly, a "sports state" or "active state"). In the normal state, the lockout mode option and activity level evaluation system (or motion detection system) would be powered down in order to save battery life, for example. In contrast, when the game state is selected by a user, the activity level or motion of the wearer may be continuously monitored. By enabling a user to change between these two states, a user can choose to optimize battery life or optimize performance depending on the needs of the situation.

In another embodiment, referring to FIG. 5, an example of input 510 (illustrated by an irregular line) is represented generally in a second graph 500. In one embodiment, input 510 may be received by the various sensors for an individual wearing an article as described herein. Second graph 500 includes an activity axis 520 (labeled as "G") and a time axis 530 (labeled as "t"). Along activity axis 520, a first dotted line represents a threshold above which the activity is deemed "high intensity" (herein referred to as a high intensity threshold 540). In this case, the threshold is associated with a 70% marker of signal activity. However, as noted above, a high intensity threshold can be set to any other threshold, such that the threshold is greater than 70% or less than 70%. Furthermore, second graph 500 includes a second dotted line that represents a threshold above which the activity is deemed at least "intermediate intensity" (herein referred to as an intermediate intensity threshold 550). In this case, intermediate intensity threshold is associated with a 40% marker of signal activity. However, an intermediate intensity threshold can be set to any other threshold, such that the threshold is greater than 40% or less than 40%. In some embodiments, an intermediate intensity threshold can be between 40% and 70%. In other embodiments, an intermediate intensity threshold can be set above 45%.

At the start of a first interval 560, based on the sensor information being received, the individual wearing the article is gradually beginning to increase activity. As shown in a first peak 592, the activity has increased to rise above intermediate intensity threshold 550.

In some embodiments, the registration of an activity that rises above intermediate intensity threshold 550 can provide a trigger to the system. In one embodiment, the trigger may indicate that the individual has initiated competitive activity. However, in other embodiments, the trigger may initiate a second step, in which the system assesses the length of time that the intermediate intensity activity lasts. Thus, in some embodiments, if the intermediate intensity activity of first interval 560 does not occur consistently for longer than a specified duration, the lockout feature will not be activated. As seen in first interval 560, while several events occur that rise above intermediate intensity threshold 550, they occur for relatively brief durations. In other words, while a first event 562 in first interval 560 includes first peak 592, it further includes a first dip 572 that drops below intermediate intensity threshold 550. In some embodiments, the duration of first event 562 that lies above intermediate intensity threshold 550 can be insufficient to trigger the lockout feature.

Similarly, a second event 564 in first interval 560 includes a second peak 594 and a second dip 574. In other words, while second peak 594 rises above intermediate intensity threshold 550, it is followed relatively quickly by second dip 574 which reflects a drop of the activity level below intermediate intensity threshold 550. In some embodiments, the duration of second event 564 that lies above intermediate intensity threshold 550 is insufficient to trigger the lockout feature. Furthermore, if the intermediate intensity activity of first interval 560 does not continue to increase in intensity, such that it rises above high intensity threshold 540, the lockout feature may not be activated in some embodiments (see FIG. 4).

However, in some embodiments, if the intermediate intensity activity occurs for longer than a specified duration, the lockout feature can be activated. Referring to a second interval 570, based on the sensor information being received, the individual wearing the article is beginning to increase the level of activity again. As shown in a third peak 596, the activity has increased to rise above intermediate intensity threshold 550. In contrast to events of first interval 560, though, during third interval 580 the activity level remains consistently above intermediate intensity threshold for a minimum duration 575. As described above, in some embodiments, the collection of sensor data or input 510 that registers above intermediate intensity threshold 550 for a specified duration can trigger the activation of the lockout feature. Here, as second interval 570 includes an event that lies above intermediate intensity threshold 550 for at least as long as minimum duration 575, the lockout feature may be activated in some embodiments. In some embodiments, the electronic system associated with the article may thus be operable in a lockout mode during periods of intermediate intensity activity. In other embodiments, minimum duration 575 may be longer or shorter than indicated here. Furthermore, in some cases, depending on the activity or the intensity level registered, the time associated with the minimum duration can be adjusted.

Figure 6:
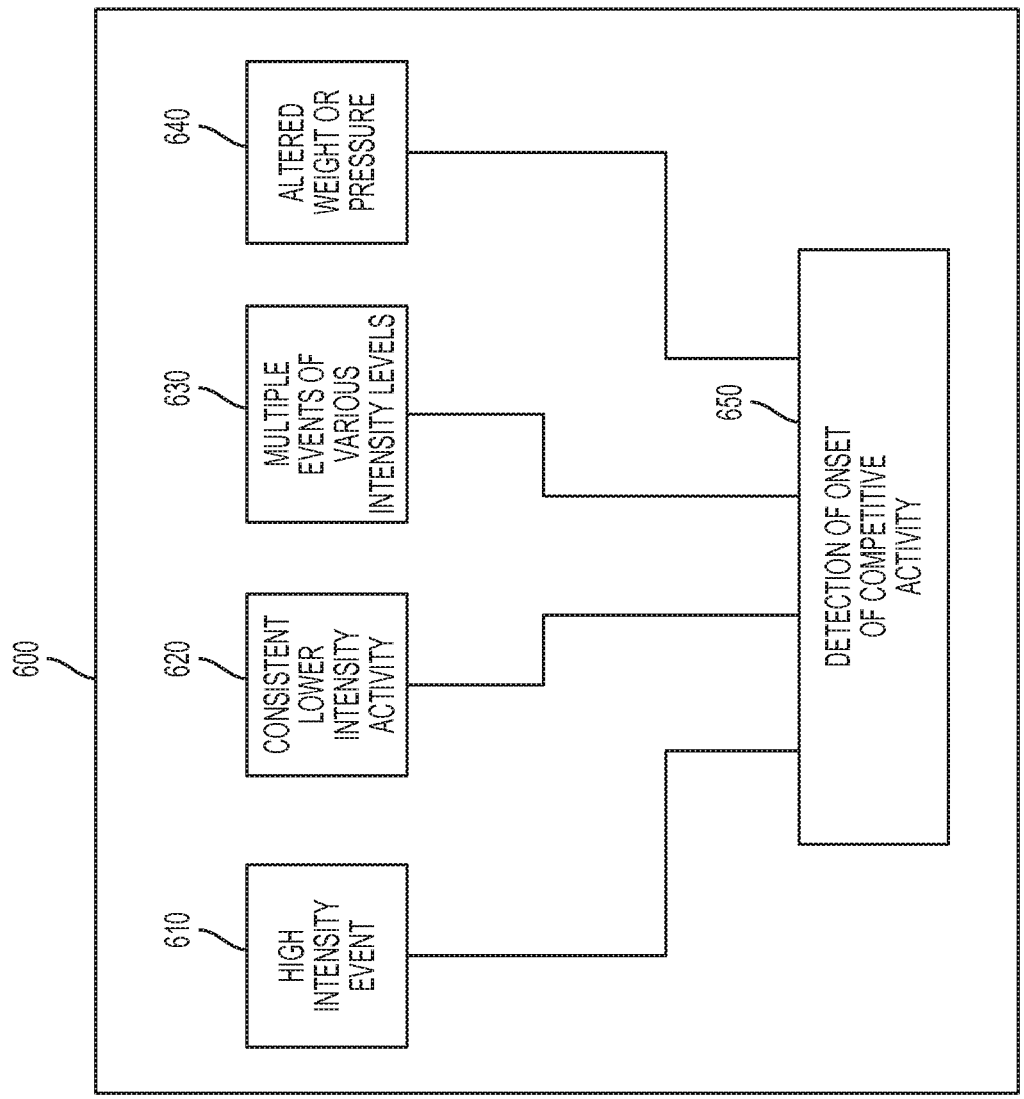
FIG. 6 is an embodiments of an influence diagram.

Referring to FIG. 6, an embodiment of an influence diagram 600 is depicted. Influence diagram 600 reflects some of the factors or variables that can be considered, incorporated, and/or used during the determination or classification of activity as competitive for purposes of this disclosure, and can help facilitate the utilization of the lockout feature. For example, a first factor 610 includes the registration of a high intensity event, as indicated with respect to FIG. 4 above. In addition, a second factor 620 may include activity that is of a lower intensity than first factor 610, but continues consistently for a specified period of time. This was discussed above with respect to the intermediate intensity activity of FIG. 5. Furthermore, in some embodiments, it should be understood that the system may also evaluate the sensor input from an article and determine competitive activity is occurring if there is a particular frequency of various types of activity levels, as represented by a third factor 630. A fourth factor 640 may be related to the changes in weight or force detected by the various sensors. In other embodiments, another factor may be the activity or sport that the user will be generally engaging in while using the article, which can be programmed into the system. In some cases, the sensors can be designed or tailored to detect specific types of motion or motion associated with specific regions of the article that typically experience more force or pressure from the foot during specific sports or activities. Thus, in some embodiments, one or more of these factors can contribute to the determination that a user is engaged in competitive activity 650. As discussed above with respect to FIG. 1, in some embodiments, this determination can be made through the operation of control unit 123, which can integrate various signals and transmit instructions to other systems in tensioning system 150. Thus, in one embodiment, control unit 123 can evaluate one or more signals and determine whether manual controls (i.e., buttons 171 disposed along control device 173) are to be enabled (or re-enabled). In another embodiment, control unit 123 may also evaluate whether manual controls are to be disabled. It should be understood that influence diagram 600 is provided as an example, and many other factors not listed here may be included in other embodiments. Furthermore, one or more factors listed in influence diagram 600 may be removed from consideration depending on the desired output or the goal of the lockout feature.

Figure 7:
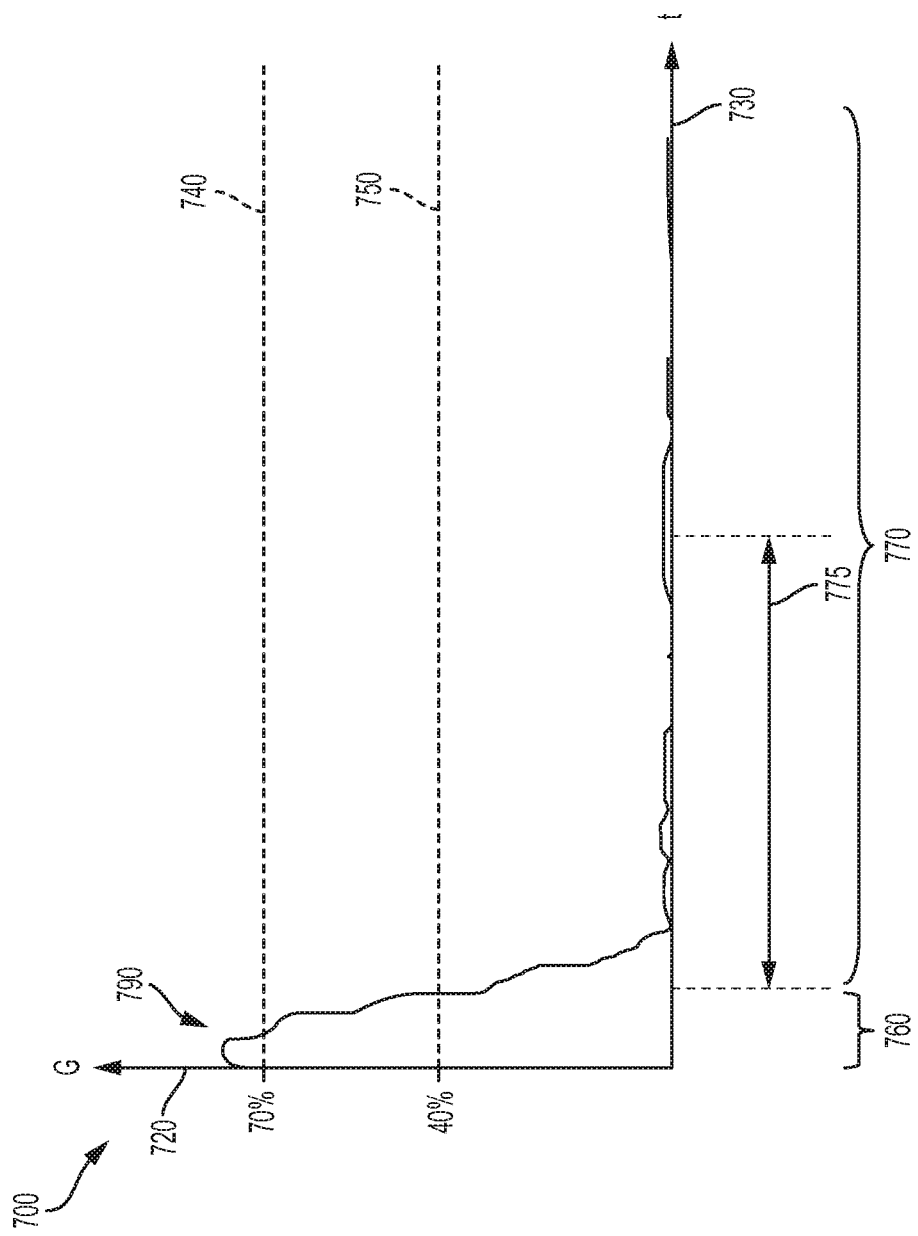
FIG. 7 is an embodiment of a representation of low intensity activity.

In different embodiments, the system described herein may determine that competitive activity has concluded or ceased. Referring to FIG. 7, an example of input 710 (illustrated by an irregular line) is represented generally in a third graph 700. In one embodiment, input 710 is received by the various sensors for an individual wearing an article as described herein. Third graph 700 includes an activity axis 720 (labeled as "G") and a time axis 730 (labeled as "t"). Along activity axis 720, a first dotted line represents a threshold above which the activity is deemed "high intensity" (herein referred to as a high intensity threshold 740). In this case, the threshold is associated with a 70% marker of signal activity. However, as noted above, a high intensity threshold can be set to any other threshold, such that the threshold is greater than 70% or less than 70%. Furthermore, third graph 700 includes a second dotted line that represents a threshold above which the activity is deemed at least "intermediate intensity" (herein referred to as an intermediate intensity threshold 750). In this case, intermediate intensity threshold is associated with a 40% marker of signal activity. However, as noted above, an intermediate intensity threshold can be set to any other threshold, such that the threshold is greater than 40% or less than 40%.

In a first interval 760, based on the sensor information being received, the individual wearing the article is generally engaged in high intensity activity, associated with a peak 790. However, the activity is decreasing, and drops into an intermediate intensity range (i.e., between high intensity threshold 740 and intermediate intensity threshold 750). Furthermore, as depicted in a second interval 770, the activity sharply decreases, and approaches the minimum activity level that can be detected. In some embodiments, the registration of an activity that falls below intermediate intensity threshold 750 can provide a trigger to the system. In one embodiment, the trigger may indicate that the individual has completed or paused competitive activity. As noted above, in some embodiments, the lockout feature can be deactivated in response to one or more lower intensity events.

However, in other embodiments, there may be a minimum duration requirement before the lockout feature is disengaged. During this time, in one embodiment, the system may assess if a user is consistently engaged in activity that registers under intermediate intensity threshold 750 for a minimum duration 775. If the system determines that this condition has not yet occurred, the lockout feature may remain activated in some embodiments. If the system does determine that the user has ceased engaging in competitive activity, where the activity level remains consistently below intermediate intensity threshold for minimum duration 775, manual controls may be reactivated in some embodiments.

As described above, in some embodiments, the collection of sensor data or input 710 that registers below intermediate intensity threshold 750 for a specified duration can trigger the deactivation of the lockout feature. Here, as second interval 770 includes an event that falls below intermediate intensity threshold 750 for at least as long as minimum duration 775, the lockout feature may be deactivated in some embodiments.

Figure 8:
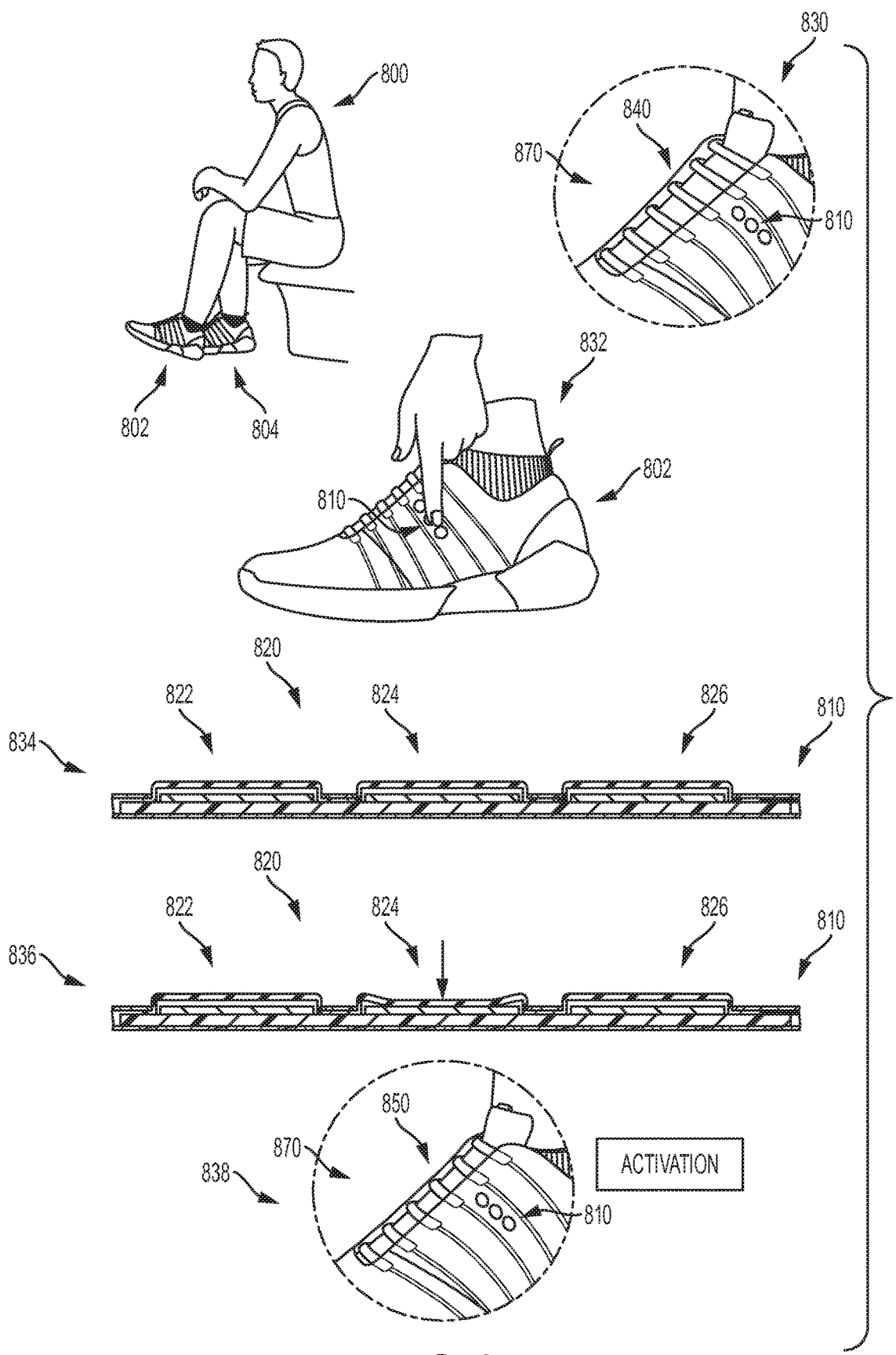
FIG. 8 is an illustration of an embodiment of the activation of manual control in an article of footwear.

In order to better illustrate some of the embodiments discussed herein, FIGS. 8-11 provide the reader with situations in which exemplary contexts for the lockout feature can be provided. Referring to FIG. 8, a first player 800 is shown seated on a bench. First player 800 is wearing a pair of footwear comprising a first article 802 and a second article 804. In FIG. 8, first article 802 and second article 804 are generally stationary or being moved relatively minimally.

In some embodiments, at least one of first article 802 and second article 804 can include an automated tensioning system, which further includes a lockout feature option. A first magnified view 830 depicts an embodiment of an automated tensioning system 870 with a control device 810 in first article 802. It can further be seen in first magnified view 830 that first article 802 is in a first tensioning state 840, where any laces or tensile elements associated with first article 802 are in a generally loose (i.e., untightened) configuration.

While seated, first player 800 may engage with control device 810 disposed in first article 802, as shown in a second magnified view 832. Control device 810 can include the manual controls for operation of automated tensioning system 870 in some embodiments. For purposes of illustration, a cross-section of an embodiment of control device 810 is shown in a third magnified view 834, where control device 810 comprises a series of buttons 820, including a first button 822, a second button 824, and a third button 826. Thus, in one embodiment, first player 800 may contact control device 810 and press second button 824. As a result of pressing second button 824, as shown in the cross-section of fourth magnified view 836, tensioning system 870 may be engaged. In one embodiment, second button 824 may operate an incremental tightening command. As shown in fifth magnified view 838, first article 802 may be subsequently tightened until it reaches a second tensioning state 850, where first article 802 is generally tensioned to a degree desired by first player 800, and the tension in second tensioning state 850 is greater than the tension of first tensioning state 840.

Figure 9:
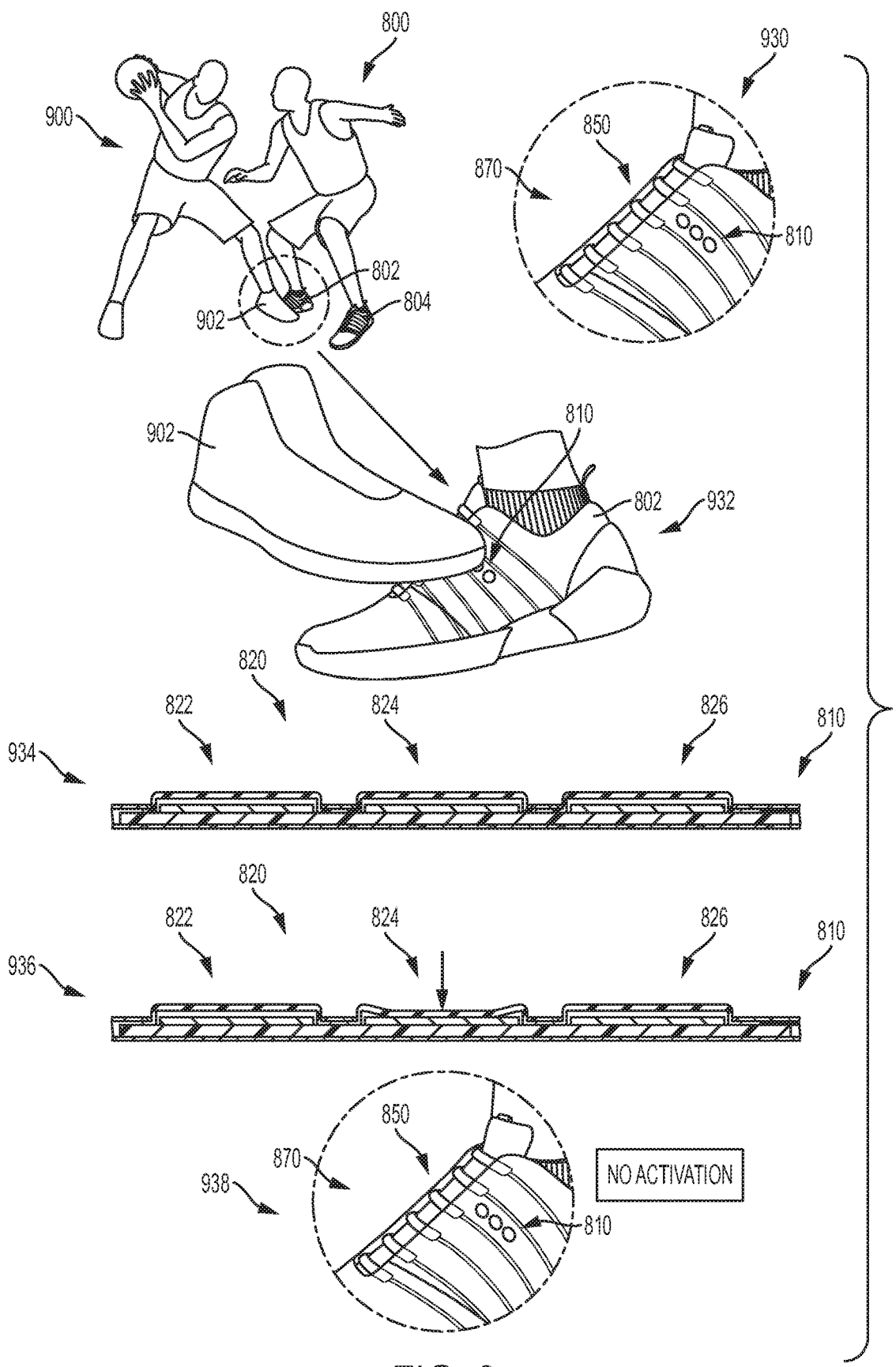
FIG. 9 is an illustration of an embodiment of the lockout of manual control in an article of footwear.

Referring now to FIG. 9, first player 800 is shown engaged in competitive activity, and interacting with a second player 900. A sixth magnified view 930 depicts an embodiment of automated tensioning system 870 in first article 802 during play. It can further be seen in sixth magnified view 930 that first article 802 is still in (or approximately in) second tensioning state 850, as described in reference to FIG. 8.

While engaged in competitive activity, first player 800 may make sudden movements, and sensors disposed in first article 802 may register high intensity levels of activity. In some embodiments, the lockout feature as described herein may be activated. Furthermore, second player 900 may inadvertently engage with control device 810 disposed in first article 802 of first player 800, as shown in a second magnified view 932. In one embodiment, a third article of footwear 902 worn by second player 900 may press or contact a portion of first article 802. In some cases, third article of footwear 902 may contact control device 810 during the competitive activity.

For purposes of illustration, a cross-section of an embodiment of control device 810 is shown in a third magnified view 934. In some embodiments, during play, second player 900 may contact control device 810 and press second button 824. A deformation or pressing of second button 824 is shown in the cross-section of fourth magnified view 836. However, because the lockout feature was previously triggered by the motion of first player 800, no command is sent, and tensioning system 870 is not operated. Thus, as represented in fifth magnified view 938, first article 802 may remain in second tensioning state 850, without change, even when one or more manual controls have been pressed, in some embodiments.

In different embodiments, any of the components described herein could be disposed in any other portions of an article, including various regions of the upper and/or sole structure. In some cases, some component parts (such as lead wires, etc.) could be disposed in one portion of an article and other component parts (such as the buttons, etc.) could be disposed in another, different, portion. The location of one or more component parts may be selected according to various factors including, but not limited to: size constraints, manufacturing constraints, aesthetic preferences, optimal design and functional placement, ease of removability or accessibility relative to other portions of the article, as well as possibly other factors.

It should be understood that the embodiments are not limited to a particular user interface or application for operating a motorized tensioning device or a tensioning system. The embodiments here are intended to be exemplary, and other embodiments could incorporate any additional control buttons, interface designs and software applications. The control buttons for initiating various operating commands can be selected according to various factors including: ease of use, aesthetic preferences of the designer, software design costs, operating properties of the system, as well as possibly other factors. Furthermore, a variety of products, including apparel (e.g., shirts, pants, footwear), may incorporate an embodiment of the control device described herein, as well as other types of articles, such as bed coverings, table coverings, towels, flags, tents, sails, and parachutes, or articles with industrial purposes that include automotive and aerospace applications, filter materials, medical textiles, geotextiles, agrotextiles, and industrial apparel.

Figure 10:
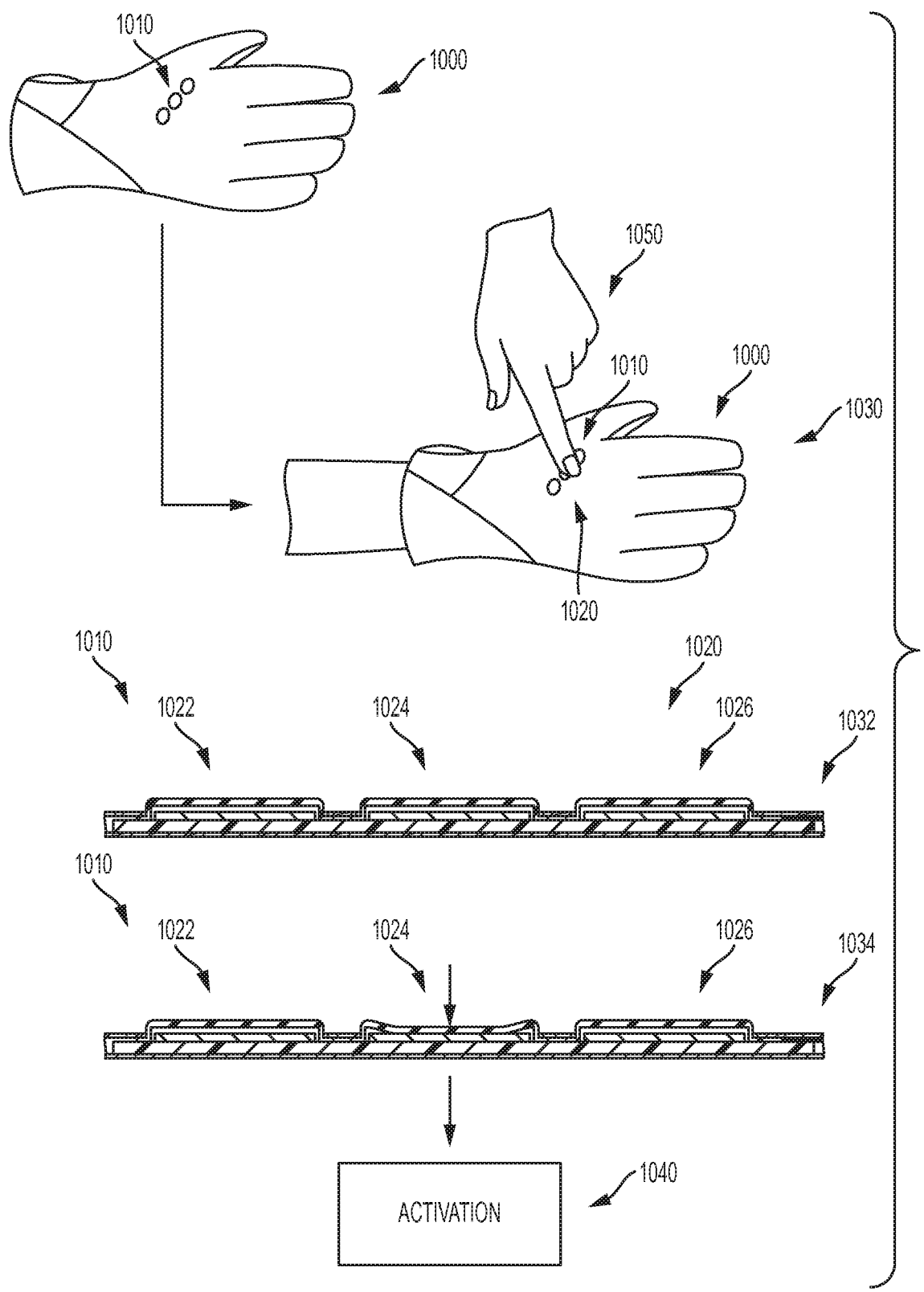
FIG. 10 is an illustration of an embodiment of the activation of manual control in an article of apparel.
Figure 11:
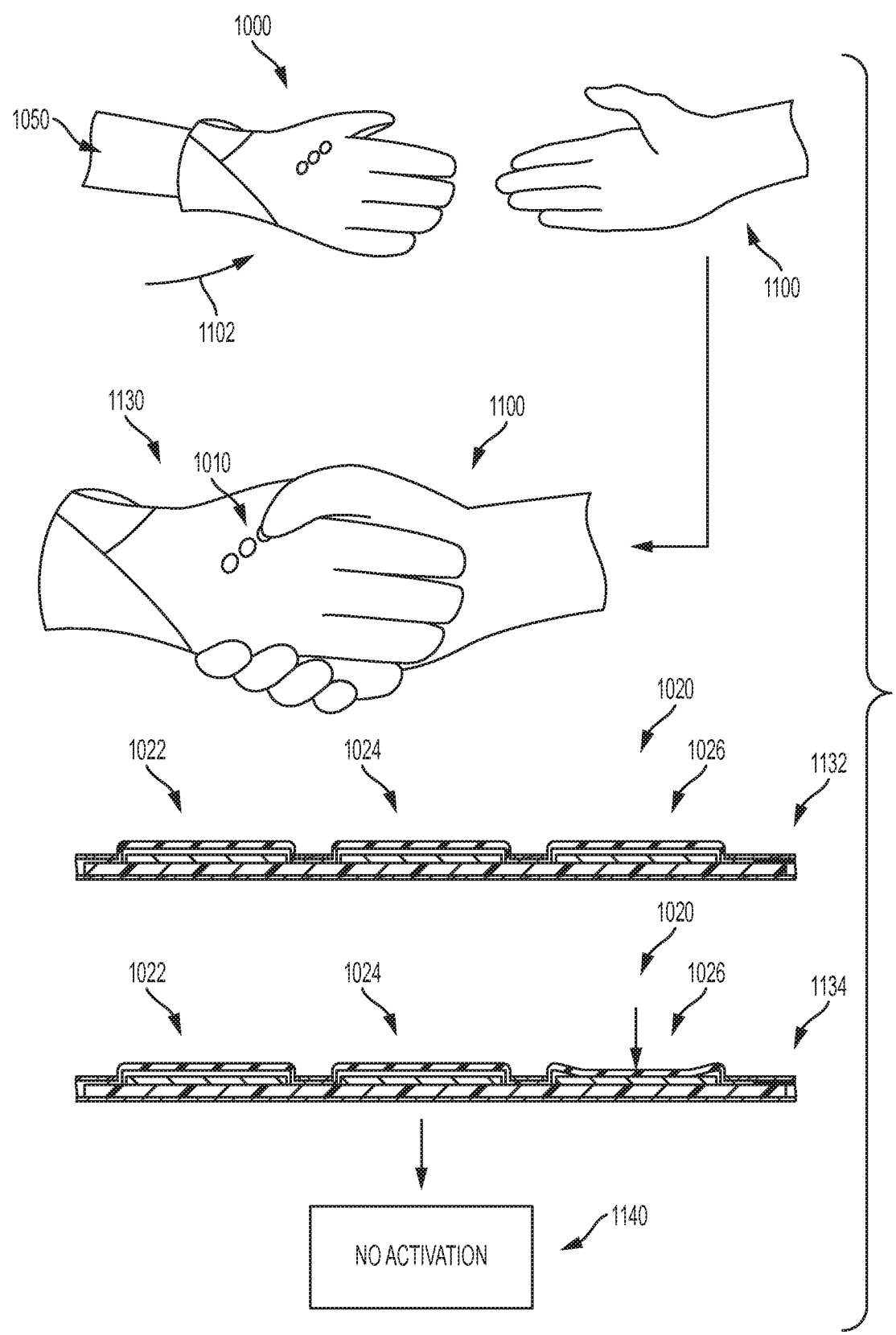
FIG. 11 is an illustration of an embodiment of the lockout of manual control in an article of apparel.

Although a control device may be utilized in a variety of products, the following discussion provides another example of an article of apparel that incorporates a control device. Referring to FIGS. 10-11, a glove 1000 is depicted. Glove 1000 includes a control device 1010. In FIG. 10, as an example, control device 1010 is located along the upper portion of glove 1000 associated with the opisthenar (back of the hand), which may provide easy access by a corresponding (opposite) hand. To better illustrate the incorporation of a control device in glove 1000, a first view 1030 is included. Three buttons 1020 are visible, and a user 1050 is interacting with control device 1010. Thus, a wearer of glove 1000 may be able to access control device 1010 and easily interact with buttons 1020.

For purposes of illustration, a cross-section of an embodiment of control device 1010 is shown in a second view 1032, where control device 1010 includes a first button 1022, a second button 1024, and a third button 1026. Thus, in one embodiment, user 1050 may contact control device 1010 and press second button 1024. As a result of pressing second button 1024, as shown in the cross-section of third view 1034, one or more functions may be engaged, represented by an "activation" event 1040. Similar to first article 802 of FIGS. 9 and 10, control device 1010 may connect with and/or operate various electronic or mechanical systems or functions within glove 1000, such as LEDs, temperature controls, tensile elements, and/or any other devices associated with glove 1000, as well as other remote mechanisms (i.e., mechanisms that are not disposed within glove 1000). In one embodiment, second button 1024 may operate an incremental increase temperature command, for example.

Referring now to FIG. 11, user 1050 is shown engaged in an activity, and interacting with a second person 1100 (represented by an ungloved hand). A fourth view 1130 depicts an embodiment of control device 1010 in glove 1100 during interaction with another individual (second person 1100). While engaged in some activity, user 1050 may make sudden movements, and sensors disposed in glove 1000 may register high intensity levels of activity. In some embodiments, the lockout feature may be activated. Furthermore, second person 1100 may inadvertently engage with control device 1010 disposed in glove 1000 of user 1050, as shown in fourth view 1130, where a thumb of second person 1100 is depicted contacting control device 1010. For purposes of illustration, a cross-section of an embodiment of control device 1010 is shown in a fifth view 1132. In some embodiments, second person 1100 may contact control device 1010 and press third button 1026. A deformation or pressing of third button 1026 is shown in the cross-section of sixth magnified view 1134. However, because the lockout feature was previously triggered by the motion of user 1050, no command is sent or transmitted from control device 1010, represented by a "no activation" event 1140.

Furthermore, the embodiments described herein may also include or refer to techniques, concepts, features, elements, methods, and/or components from U.S. Patent Publication Number 2016-0345679 A1, published Dec. 1, 2016, (previously U.S. patent application Ser. No. 14/723,972, filed May 28, 2015), titled "An Article Of Footwear And A Method Of Assembly Of The Article Of Footwear," U.S. Patent Publication Number 2016-0345654, published Dec. 1, 2016, (previously U.S. patent application Ser. No. 14/723,880, filed May 28, 2015), titled "A Charging System for an Article of Footwear," and U.S. Patent Publication Number 2016-0345671 A1, published Dec. 1, 2016, now U.S. Pat. No. 9,894,954 which issued on Feb. 20, 2018, (previously U.S. patent application Ser. No. 14/723,994, filed May 28, 2015), titled "A Sole Plate for an Article of Footwear," and U.S. Patent Publication Number 2016-0345655, published Dec. 1, 2016, (previously U.S. patent application Ser. No. 14/724,007, filed May 28, 2015), titled "A Control Device for an Article of Footwear," the disclosures of each application being herein incorporated by reference in their entirety.

While various embodiments have been described, the description is intended to be exemplary, rather than limiting and it will be apparent to those of ordinary skill in the art that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

What is claimed is:

1. A control device-implemented method of disabling manual controls in the control device associated with an article of footwear, comprising:
   receiving, from a sensor of the article of footwear, a signal indicative of a competitive activity;
   determining if a user wearing the article of footwear is engaging in competitive activity based on the signal as received;
   operating in an operating mode, in which manual control of the control device is enabled if the user is determined not to be engaged in the competitive activity; and
   operating in a lockout mode in which the manual control of the control device is disabled if the user is determined to be engaged in the competitive activity.

2. The method of claim 1, wherein determining if the user is engaging in competitive activity comprises determining if the user has begun to engage in the competitive activity and operating in the lockout mode upon determining that the user has begun to engage in the competitive activity.

3. The method of claim 2, further comprising, following determining that the user has begun to engage in the competitive activity, determining if the user has stopped competing if it is determined that the user has begun to engage in the competitive activity, wherein the controller is configured to operate in the operating mode upon determining the user has stopped engaging in the competitive activity.

4. The method of claim 3, wherein the controller is configured to remain in the lockout mode until the controller determines that the user has stopped engaging in the competitive activity.

5. The method of claim 3, further comprising determining, based on the sensor signal, if the user is engaging in an intermediate intensity activity, wherein the controller determines that the user is not engaged in the competitive activity if the user is engaged in the intermediate intensity activity.

6. The method of claim 2, further comprising determining, based on the sensor signal, if the user is engaging in a high intensity activity, wherein the controller determines that the user is engaged in the competitive activity if the user is engaged in the high intensity activity.

7. A non-transitory computer readable medium which, when implemented by a control device associated with an article of footwear, causes the control device to implement operations comprising:
   receiving, from a sensor of the article of footwear, a signal indicative of a competitive activity;
   determining if a user wearing the article of footwear is engaging in competitive activity based on the signal as received;
   operating in an operating mode, in which manual control of the control device is enabled if the user is determined not to be engaged in the competitive activity; and
   operating in a lockout mode in which the manual control of the control device is disabled if the user is determined to be engaged in the competitive activity.

8. The computer readable medium of claim 7, wherein determining if the user is engaging in competitive activity comprises determining if the user has begun to engage in the competitive activity and operating in the lockout mode upon determining that the user has begun to engage in the competitive activity.

9. The computer readable medium of claim 8, further comprising, following determining that the user has begun to engage in the competitive activity, determining if the user has stopped competing if it is determined that the user has begun to engage in the competitive activity, wherein the controller is configured to operate in the operating mode upon determining the user has stopped engaging in the competitive activity.

10. The computer readable medium of claim 9, wherein the controller is configured to remain in the lockout mode until the controller determines that the user has stopped engaging in the competitive activity.

11. The computer readable medium of claim 9, further comprising determining, based on the sensor signal, if the user is engaging in an intermediate intensity activity, wherein the controller determines that the user is not engaged in the competitive activity if the user is engaged in the intermediate intensity activity.

12. The computer readable medium of claim 8, further comprising determining, based on the sensor signal, if the user is engaging in a high intensity activity, wherein the controller determines that the user is engaged in the competitive activity if the user is engaged in the high intensity activity.

\* \* \* \* \*